US011180575B2

(12) United States Patent
Lane et al.

(10) Patent No.: US 11,180,575 B2
(45) Date of Patent: Nov. 23, 2021

(54) THERMALLY INHIBITED STARCH AND PROCESS FOR MAKING

(71) Applicant: Corn Products Development, Inc., Westchester, IL (US)

(72) Inventors: Christopher Lane, Bridgewater, NJ (US); Kamlesh Shah, Bridgewater, NJ (US); Tarak Shah, Bridgewater, NJ (US)

(73) Assignee: Corn Products Development, Inc., Westchester, IL (US)

( * ) Notice: Subject to any disclaimer, the term of this patent is extended or adjusted under 35 U.S.C. 154(b) by 0 days.

(21) Appl. No.: 16/719,391

(22) Filed: Dec. 18, 2019

(65) Prior Publication Data

US 2020/0207877 A1    Jul. 2, 2020

Related U.S. Application Data

(60) Provisional application No. 62/786,066, filed on Dec. 28, 2018, provisional application No. 62/846,941, filed on May 13, 2019.

(30) Foreign Application Priority Data

May 17, 2019 (EP) .................................. 19175255

(51) Int. Cl.
*C08B 31/00* (2006.01)
(52) U.S. Cl.
CPC .................................. *C08B 31/00* (2013.01)
(58) Field of Classification Search
CPC .................................................. C08B 31/00
See application file for complete search history.

(56) References Cited

U.S. PATENT DOCUMENTS

| 5,718,770 A | 2/1998 | Shah et al. |
| 5,720,822 A | 2/1998 | Jeffcoat et al. |
| 5,725,676 A | 3/1998 | Chiu et al. |
| 5,932,017 A | 8/1999 | Chiu et al. |
| 6,010,574 A | 1/2000 | Jeffcoat et al. |
| 6,221,420 B1 | 4/2001 | Thomas et al. |
| 6,231,675 B1 | 5/2001 | Chiu et al. |
| 6,451,121 B2 | 9/2002 | Chiu et al. |
| 8,268,989 B2 | 9/2012 | English et al. |
| 8,471,003 B2 | 6/2013 | Weisser et al. |
| 9,688,788 B2 | 6/2017 | Plotkin et al. |
| 9,783,620 B2 | 10/2017 | Essers et al. |
| 9,982,064 B2 | 5/2018 | Santhanam et al. |
| 10,316,107 B2 | 6/2019 | Essers et al. |
| 10,463,066 B2 | 11/2019 | Han et al. |
| 2009/0041918 A1 | 2/2009 | Shi |
| 2014/0287131 A1 | 9/2014 | Drew et al. |
| 2015/0368370 A1 | 12/2015 | Grull et al. |
| 2018/0192683 A1 | 7/2018 | Lane et al. |
| 2018/0249720 A1 | 9/2018 | Jiang et al. |

FOREIGN PATENT DOCUMENTS

| DE | 2713673 A1 | 10/1978 |
| EP | 1281721 A1 | 2/2003 |
| EP | 0710670 A1 | 9/2018 |
| JP | S61254602 A | 11/1986 |
| WO | 00/73353 A1 | 12/2000 |
| WO | 2018013831 A1 | 1/2018 |
| WO | 2018/069535 A1 | 4/2018 |
| WO | 2018-112383 A1 | 6/2018 |

OTHER PUBLICATIONS

European Search Report—EP 19 17 5255, dated Dec. 17, 2019, 3 pgs.
Millipore Sigma buffer reference center, available at https://sigmaaldrich.com/US/en/technical-documents/protocol/protein-biology/protein-concentration-and-buffer-exchange/buffer-reference-center#citric2, 2021 (14 pages).

*Primary Examiner* — Jonathan S Lau
(74) *Attorney, Agent, or Firm* — Jason Grauch

(57) ABSTRACT

Improved thermally inhibited starch is disclosed and methods of making such starch are disclosed. In some embodiments a thermally inhibited starch has improved whiteness and flavor. In some embodiments a method for making a thermally inhibited starch includes providing adding a buffer and an acid to a starch to obtain a pH adjusted starch having an acidic pH and thermally inhibiting the pH adjusted starch. The technology further pertains to methods of making the thermally inhibited starch in batch, continuous, continuous-like process or combinations thereof.

16 Claims, 7 Drawing Sheets

THERMALLY INHIBITED STARCH AND PROCESS FOR MAKING

This application claims the benefit of U.S. Provisional patent application No. 62/786,066, filed Dec. 28, 2018; U.S. Provisional patent application No. 62/846,941, filed May 13, 2019; and European patent application No.: EP19175255.9, filed May 17, 2019, which are incorporated herein by reference in all its entirety for all purposes.

This specification discloses improved thermally inhibited starch and more particularly improved dry thermally inhibited starch.

Starch is glucose polymers, amylose and amylopectin, obtainable from plants. Amylose and amylopectin, however, do not exist free within a plant but instead exist in granules made of a plurality amylopectin (and usually) amylose polymers. The granule has crystalline and amorphous regions, and when heated in water the granule swells and eventually breaks down, a process called gelatinization. The swelling allows starch to act as a thickener, but that effect breaks down as the starch does.

Within the art inhibition refers to any one of a set of processes that, among other things, are used to modify starch so that it resists gelatinization. One previous set of inhibition processes involve heating a dehydrated starch at temperatures above the starch's gelatinization temperature. Some previous thermal inhibition processes dehydrated starch in alcohol then heated the alcohol slurry (a wet process). Other previous processes dehydrate starch in air or vacuum(a dry process). Such processes commonly had various drawbacks, including but not limited, to progressing too slowly to run in a continuous process, producing noticeable flavors such as noticeable vinyl flavors or noticeable grainy flavors, and producing browner starch. This specification discloses improved methods for obtaining thermally inhibited starches that overcome the foregoing and other problems.

Figure 1A:
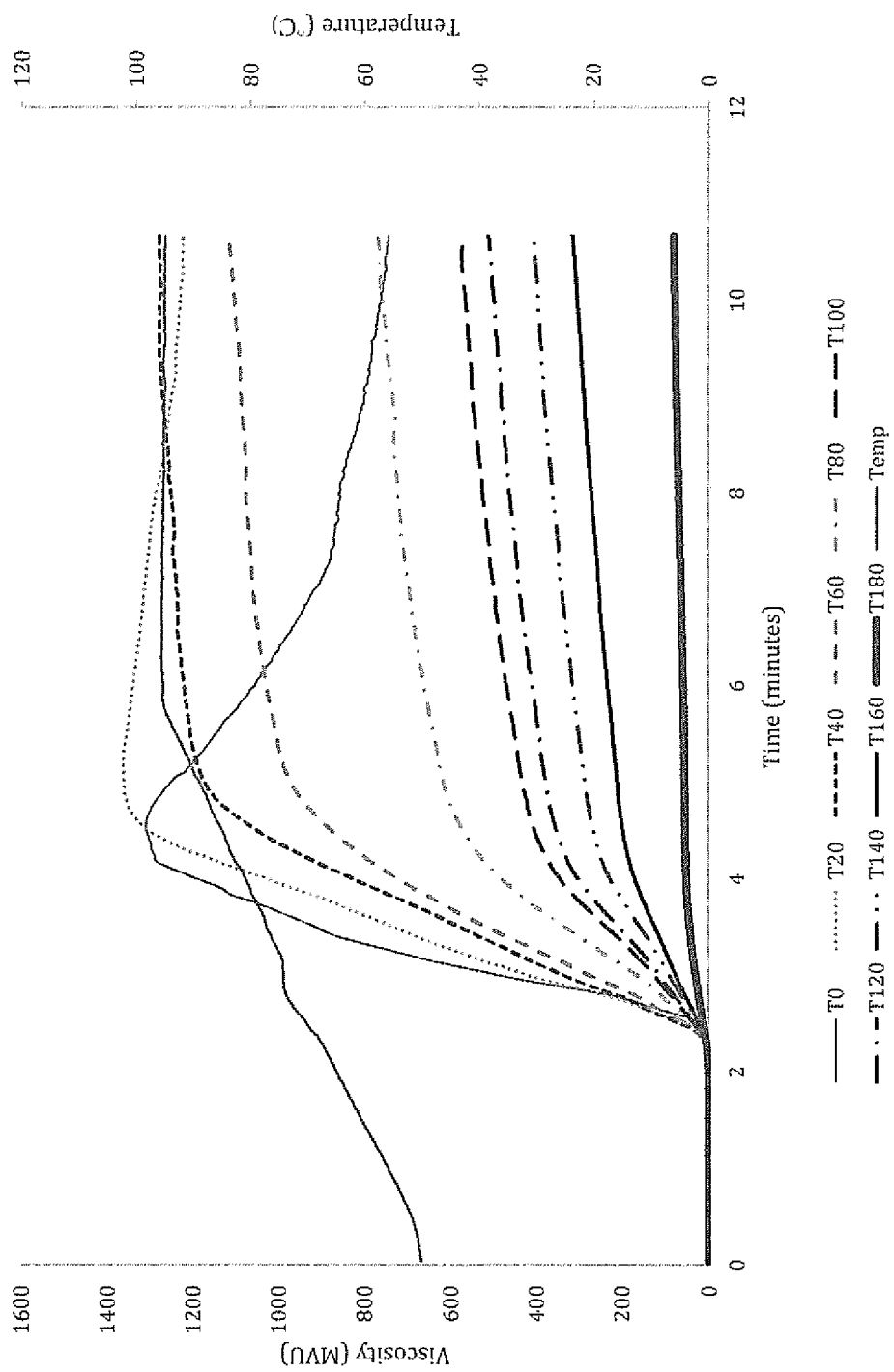
FIG. 1(a) compares the viscosity profile plots of thermally inhibited starches made in some of the various embodiments of the improved method.

The present technology pertains to improved thermally inhibited starch and improved methods for making such starches, and in various non-limiting embodiments this specification discloses an improved method for making a thermally inhibited starch, and improved method for making a dry thermally inhibited starch, a continuous method for making an improved thermally inhibited starch, an improved thermally inhibited starch, an improved dry thermally inhibited starch, a thermally inhibited or dry thermally inhibited starch that is inhibited to have a desired peak hot viscosity, a whiter dry thermally inhibited starch, a thermally inhibited or dry thermally inhibited starch having improved taste.

In any embodiment described in this specification thermally inhibited starch is obtained from a granular starch (meaning not gelatinized). In any embodiment described in this specification a thermally inhibited starch is a granular starch (meaning not gelatinized). In any embodiment a starch useful for thermal inhibiting may obtained from milling a starch containing plant part to obtain a milled plant material (e.g. a flour). Following milling a milled plant material may include starch and protein, which are present in the milled plant material in essentially the same proportion (w/w) as they existed in the unmilled plant part. Following milling, a milled plant material may be fractionated (for example by a dry process using air classification, or a wet process using isoelectric point isolation or hydrocylonic separation) to adjust the weigh percentage proportion of one component of milled plant material relative to another (e.g. increasing starch content relative protein). In any embodiment a process for making a thermally inhibited starch may be applied to any starch-containing milled or milled and fractionated plant material. In any embodiment a process for making a thermally inhibited starch may be applied to a milled and fractionated plant material having greater than about 95% starch (w/w), or greater than about 98% starch (w/w), or greater than about 99% starch (w/w). In any embodiment a thermally inhibited starch may be obtained by thermally inhibiting a milled plant material or a milled and fractionated plant material; in such embodiments the thermally inhibited starch may present in the thermally inhibited milled or milled and fractionated plant material or may be further fractionated following thermal inhibition. In any embodiment a thermally inhibited starch is obtained from a food grade starch (as defined for example by the US Pharmacopeia). In any embodiment a starch useful in a thermal inhibition process includes less than 1% protein (w/w) or is less than 0.5% or, is less than 0.3%.

"Inhibition" of starch is a known term in the art, and within this specification is understood to have its full range of meaning. While not limiting the full meaning of inhibition of starch, an inhibited starch (and the level, degree, or amount that a starch is inhibited) can be described relative to the thickening power or swelling power of a starch, and an inhibited starch can be thought of as being highly inhibited—and thus having relatively low thickening power or swelling power—moderately inhibited, or having low inhibition.

"Gelatinization" of starch is a known term in the art that covers a set of phenomena occurring when starch is heated water (depending on time and temperature). Within this specification gelatinization is understood to have its full meaning within the art. While not limiting the full meaning of gelatinization of starch, in any embodiment ungelatinized starch exhibits a Maltese cross diffraction pattern when viewed under polarized light; gelatinized starch does not.

"Thermal inhibition," as used in this specification, refers to any process that heats ungelatinized, dehydrated starch in a manner that inhibits the starch. Thermal inhibition refers to both wet and dry processes for thermally inhibiting starch.

In this specification, "dry thermal inhibition" refers to a process wherein starch is dehydrated and thermally inhibited in essentially moisture free conditions. In some embodiments the moisture free conditions include thermally inhibiting starch any gas where the gas will not react with the starch. In illustrative non-limiting embodiments, the gas is air, which may be at any pressure, or for example at about 1 atmosphere of pressure. In illustrative, non-limiting embodiments the starch may be inhibited in low gas pressure, or essentially under vacuum conditions. In any embodiment a dry thermal inhibition process produces a dry thermally inhibited starch.

In this specification, a "wet thermal inhibition" process refers to a process wherein starch is dehydrated, thermally inhibited, or both in a non-aqueous solution, such as an alcohol solution. Starch made in a wet thermally inhibition process is referred to as a wet thermally inhibited starch.

In any embodiment, thermally inhibited starches can be made from one or more of the following base materials corn, waxy corn, high amylose corn, tapioca, waxy tapioca, potato, waxy potato, rice, waxy rice, sago, arrowroot, legume (seeds from plants of the family leguminosae, including peas, chick peas, lentils, fava beans, lupin bean, and mung bean), sorghum, barley, waxy barley, and wheat. Within in this specification reference to waxy corn starch includes reference to hybrids, crossbreeds, and other waxy corn starch variants, including but not limited to a hybrid waxy corn starch sold by Ingredion Incorporated under the name WaxiPro® corn starch. Within this specification, waxy, as a descriptor of a starch, means a starch having low amylose, such as less than about 10% or, or less about 7%, or less that about 5%, or less than about 3%, or less than about 1% or essentially 0% amylose content by weight. Within in this specification high amylose as a description of a starch means a starch having great than about 40% amylose, for example by not limited to starch having about 50% amylose content by weight or starch having about 70% weight amylose in a starch granule.

The present technology pertains to thermally inhibited starch and to dry thermally inhabited starch. In some embodiments a dry thermally inhibited starch has a whiteness as described by a Hunter L that is equal to the whiteness of a native starch from the same base. In various other embodiments a dry thermally inhibited starch has a Hunter L value of greater than about 92, or greater than 93, or greater than 94, or greater than 95, or about 92 to about 96 or about 92 to about 95, or about 93 to about 95, or about 94 to about 95, or about 95. In any embodiment of the thermally inhibited starch, the forgoing whiteness is obtained regardless of the level of inhibition. In various embodiments the foregoing whiteness is obtained regardless of washing, starch may be washed using known techniques to further improve the whiteness of the obtained starch In some embodiments a thermally inhibited starch or a dry thermally inhibited starch has a whiteness as described by a Hunter L value of 92, or greater than 92, or greater than 93, or greater than 94, or greater than 95, or about 92 to about 96 or about 92 to about 95, or about 93 to about 95, or about 94 to about 95, or about 95 and has improved flavor such as reduced grainy flavor, cardboard flavor, plastic flavor, vinyl flavor or mixtures thereof. In any embodiment of the thermally inhibited starch, the foregoing whiteness and improved flavor is obtained regardless of the level of inhibition.

In some embodiments a thermally inhibited, or dry thermally inhibited starch is thermally inhibited to have a desired hot peak viscosity. In any embodiments a hot peak viscosity can be measured using a Micro-Visco-Amylo-Graph (MVAG) (available for example from Brabender GmbH & Co KG), which plots the relative viscosity changes in a starch slurry over a defined time and temperature course. In any embodiment a thermally inhibited starch can be measured in Micro-Visco-AmyloGraph Units ("MVAG-Units," "MVU"). Commonly MVAG plots measure the viscosity change of starch slurry as temperature ramps from relatively cool to a peak hot temperature at which the starch slurry is held for a defined time. A commonly used MVAG plot records the viscosity changes of a 6% starch solids slurry having pH 6 during the following time and temperature course: heating of starch slurry from room temperature to 50° C., further heating of slurry from 50° C. to 95° C. at a heating rate of 8° C./min and holding slurry at 95° C. for 15 minutes (also called in this specification 95° C.+15). Extended MVAG testing may further plot the viscosity change of the slurry as it cools after heating is completed at 95° C.+15. A useful viscosity measurement is the peak hot viscosity, which is the highest viscosity obtained between 95° C. and 95° C.+15. In embodiments a starch is inhibited to have a peak hot viscosity of up to about 2000 MVU, or about 50 and about 2000 MVU, or less than about 500 MVU, or about 50 to about 500, or about 100 to about 500 MVU, or about 100 to about 400 MVU, or about 100 to about 300 MVU, or about 100 to about 200 MVU, or about 500 to about 1200 MVU, or about 600 to about 1200 MVU, or about 700 to about 1200 MVU, or about 800 to about 1200 MVU, or about 900 to about 1200 MVU, or about 1000 to about 1200 MVU, or about 1200 to about 2000 MVU, or about 1300 to about 2000 MVU, or about 1400 to about 2000 MVU, or about 1500 to about 2000 MVU, or about 1600 to about 2000 MVU, or about 1700 to about 2000 MVU, or about 1800 to about 2000 MVU.

In some embodiments a thermally inhibited starch or dry thermally inhibited starch has a high level of inhibition, which can be described as a thermally inhibited starch having a peak hot viscosity (slurry at 6% solids and pH 6) of less than about 600 MVU, or less than about 500 MVU or less than about 400 MVU, or about 100 to less than about 600 MVU, or about 200 to less than about 600 MVU, or about 300 to less than about 600 MVU, or about 200 to about 500 MVU, or about 300 to 500 MVU. In some embodiments a highly thermally inhibited starch has a peak hot viscosity (slurry at 6% solids and pH 6) of about 200 to less than about 600 MVU. In some embodiments a highly thermally inhibited starch has a peak hot viscosity (slurry at 6% solids and pH 6) of about 300 to about 500 MVU. In some embodiments a thermally inhibited a highly thermally inhibited starch further has a rising viscosity (slurry at 6% solids and pH 3) from 95° C. to 95° C.+15 minutes. In some embodiments a thermally inhibited a highly thermally inhibited starch further has a viscosity (slurry at 6% solids and pH 3) from 95° C. to 95° C.+15 of about 500 to about 1000 MVU, or about 500 to about 900 MVU, or about 500 to about 800 MVU, or about 500 to about 700 MVU, or about 600 to about 1000 MVU, or about 700 to about 1000 MVU, or about 600 to about 900 MVU, or about 600 to about 800 MVU, or about 700 to about 800. In some embodiments a thermally inhibited a highly thermally inhibited starch further has a viscosity (slurry at 6% solids and pH 3) from 95° C. to 95° C.+15 of about 600 to 900 MVU. In some embodiments a highly thermally inhibited starch further has a viscosity (slurry at 6% solids and pH 3) from 95° C. to 95° C.+15 of about 700 to 800 MVU. In any embodiment thermally inhibited starch having a high level of inhibition further has a whiteness (as measured by Hunter L value) of greater than about 91, or greater than 92, or greater than 93, or greater than 94, or greater than 95, or about 91 and about 96 or about 92 to about 95. In any embodiments, thermally inhibited starch having a high level of inhibition further has a whiteness (as measured by Hunter L value) of about 91 to about 94. In any embodiments thermally inhibited starch having a high level of inhibition further has a whiteness (as measured by Hunter L value) of about 94. In any embodiments a starch having highly thermal inhibition further has improved flavor such as reduced grainy flavor, cardboard flavor, plastic flavor, vinyl flavor or mixtures thereof.

In any embodiments a thermally inhibited starch or dry thermally inhibited starch has a moderate level of inhibition, which can be described as a thermally inhibited starch having a peak hot viscosity (slurry at 6% solids and pH 6) of about 600 to about 1100 MVU, or about 600 to 1000 MVU, or about 600 to about 900 MVU, or about 600 to 800 MVU. In any embodiments a thermally inhibited starch having a moderate level of inhibition has a peak hot viscosity (slurry at 6% solids and pH 6) of about 600 to about 1000 MVU. In some embodiments a thermally inhibited starch having a moderate level of inhibition has a peak hot viscosity (slurry at 6% solids and pH 6) of about 600 to about 800 MVU. In some embodiments a thermally inhibited starch having a moderate level of inhibition further has a steady viscosity (slurry at 6% solids and pH 3) from 95° C. to 95° C.+15 minutes or a viscosity that varies less than about 200 MVU, or less than about 150 MVU, or less than about 100 MVU, or less than about 50 MVU. In any a thermally inhibited starch having a moderate level of inhibition further has a whiteness of greater than about 92, or greater than 92, or greater than 93, or greater than 94, or greater than 95, or about 92 to about 96 or about 92 to about 95. In any embodiments, thermally inhibited starch having a moderate level of inhibition further has a whiteness (as measured by Hunter L value) of about 93 to about 95. In any embodiments, thermally inhibited starch having a moderate level of inhibition further has a whiteness (as measured by Hunter L value) of about 94. In any embodiments, thermally inhibited starch having a moderate level of inhibition further has a whiteness (as measured by Hunter L value) of about 95. In any embodiments a starch having moderately thermal inhibition further has improved flavor such as reduced grainy flavor, cardboard flavor, plastic flavor, vinyl flavor or mixtures thereof.

In any embodiments, a thermally inhibited starch or dry thermally inhibited starch has a low level of inhibition which can be described as a thermally inhibited starch having a peak hot viscosity (slurry at 6% solids and pH 6) of about 1200 to about 2000 MVU, or about 1200 to about 1900 MVU, or about 1200 to about 1800 MVU, or about 1200 to about 1700 MVU, or about 1200 to about 1600 MVU, or about 1200 to about 1500, MVU or about 1300 to about 1600 MVU, or about 1300 to about 1500 MVU in a continuous process. In any embodiments a thermally inhibited starch having a low level of inhibition has a peak hot viscosity (slurry at 6% solids and pH 6) of about 1200 to about 1700 MVU. In any embodiments a thermally inhibited starch having a low level of inhibition has a peak hot viscosity (slurry at 6% solids and pH 6) about 1300 to about 1500 MVU. In any embodiments a thermally inhibited starch in slurry (6% solids and pH 6) having low inhibition, further has a steady viscosity from 95° to 95°+15 minutes or has a viscosity that varies less than about 200 MVU, or less than about 150 MVU, or less than about 100 MVU, or less than about 50 MVU. In any embodiments a starch having low thermal inhibition further has a whiteness (as measured by Hunter L value) of greater than about 92, or greater than 92, or greater than 93, or greater than 94, or greater than 95, or about 92 and about 96 or about 92 and about 95. In any embodiments a starch having low thermal inhibition further has a whiteness (as measured by Hunter L value) of about 94 to about 96. In any embodiments a starch having low thermal inhibition further has a whiteness (as measured by Hunter L value) of about 95. In any embodiments a starch having low thermal inhibition further has improved flavor such as reduced grainy flavor, cardboard flavor, plastic flavor, vinyl flavor or mixtures thereof.

Relative viscosity of a starch slurry over a defined time and temperature course may also be measured using a rapid-visco-analyzer (RVA), which reports viscosity in cP. RVA tests may use the same time and temperature course as used for MVAG testing. Like MVAG, it is useful to know the peak hot viscosity of a starch slurry during an RVA test. Peak hot viscosity has the same meaning in RVA testing as it does in MVAG testing—i.e. obtained between 95° C. and 95° C.+15. MVU and cP do not necessarily correspond but calibrating standards are known to allow for conversion between units, for example, published at http://www-.starch.dk/ISI/methods/19brabenderNotes.htm. Useful peak viscosities as measured by cP are generally within the same ranges as for MVU. Accordingly, in embodiments, a starch is inhibited to have a peak viscosity of up to about 2000 cP, or about 50 and about 2000 cP. Similarly highly inhibited starches have peak hot viscosity of less than about 500 cP, or about 50 to about 500 cP, or about 100 to about 500 cP, or about 100 to about 400 cP, or about 100 to about 300 cP, or about 100 to about 200 cP. Moderately inhibited starches have a peak hot viscosity of about 500 to about 1200 cP, or about 600 to about 1200 cP, or about 700 to about 1200 cP, or about 800 to about 1200 cP, or about 900 to about 1200 cP, or about 1000 to about 1200 cP. Starches having low inhibition have peak hot viscosity of about 1200 to about 2000 cP, or about 1300 to about 2000 cP, or about 1400 to about 2000 cP, or about 1500 to about 2000 cP, or about 1600 to about 2000 cP, or about 1700 to about 2000 cP, or about 1800 to about 2000 cP.

In some embodiment a thermally inhibited starch or dry thermally inhibited starch may have a swelling volume, which may also be referred to as a sediment volume (i.e. volume of the starch sediment after being allowed to fully swell), or a swelling power. Generally highly inhibited starch swells less than lesser inhibited starches. Swelling volume varies greatly based on measurement conditions, including how much starch is used in the testing solution, as salt prevents starch swelling. Swelling volumes for highly, moderately and lowly inhibited starches range from about 1 to about 50 mg/L and all subranges within. Swelling volume may be measured as follows: a) preparing a 5% starch slurry in 1% NaCl solution in a beaker; b) heating the slurry in the beaker using a boiling water bath having a minimum temperature of 95° C. for 20 minutes, stirring for the first 3 minutes and then cover with a watch glass for the remaining time; c) diluting the slurry to 1% and allowing to settle for 24 hours and optionally and measuring the volume of the settled starch.

In other non-limiting embodiments specification discloses methods for making a thermally inhibited starch or a dry thermally inhibited starch. In any embodiment described in this specification, a method for thermally inhibiting a starch may be thought of as including a starch preparation step and a thermal inhibition step. In any embodiment a starch preparation step includes an optional neutralization step, a buffering step and a pH adjusted step. In any embodiment described in this specification, a thermal inhibition step includes a dehydration step and a thermal inhibition step.

In any embodiment starch preparation step is carried out in one or more starch slurries, where slurry is used as it is commonly used in the art. Without limiting the full understanding of the term, a slurry may be understood to be a semiliquid mixture, comprising liquid and fine particles. Starch slurries useful in this invention do not have lower solids content limit. At an upper bound, the starch content is high enough that the mixture is no longer semiliquid; in this state the composition may be referred as a starch cake—i.e. wet starch that sticks together and is able to form a cohesive mass. In any embodiment a starch slurry comprises about 30% to about 60% starch by weight of the slurry, or about 35% to about 55%, or about 35% to about 50% or about 35% to about 45%, or about 36% to about 44% or about 37% to about 43% or about 40%. In any embodiment starch slurries useful for making thermally inhibited starch have solids content between 35% to 50% starch solids. In any embodiment a slurry useful for making a thermally inhibited starch is an aqueous slurry.

In any embodiment, a method for making a thermally inhibited starch as described in this specification comprises, prior to thermal inhibition, soaking a starch in a buffered solution or an aqueous buffered solution to form a buffered starch. In any embodiment the forgoing buffering step uses a suitable food grade buffer. In any embodiment described in this specification, a food grade buffer useful for making a thermally inhibited starch is a conjugate acid, or salt of an organic acid. In at least some embodiments the buffer is a carbonate buffer or a citrate buffer. In some embodiments a food grade buffer is potassium citrate and/or tripotassium citrate. In any embodiment a food grade buffer is added to a starch slurry prior to thermal inhibition in an amount less than less than about 10% by weight of the starch or less than 5%, or less than about 4% or less than about 3% or less than about 2% or less than about 1% or between greater than 0% to about 4% or about 0.1% to about 3% or about 0.1% to about 2% or about 0.1% to about 1% or about 0.5% to about 2% or about 0.6% to about 2% or about 0.8% to about 2% or about 0.9% to about 2%% or about 1% to about 2% or about 1% or the starch.

In any embodiment using a citrate buffer and/or citric acid in the pH adjustment step the total citrate and citric acid content of the slurry is less than about 5% by weight of the starch, or less than about 4% or less than about 3% or less than about 2% or less than about 1% or between greater than 0% to about 4% or about 0.1% to about 3% or about 0.1% to about 2% or about 0.1% to about 1% or about 0.5% to about 2% or about 0.6% to about 2% or about 0.8% to about 2% or about 0.9% to about 2%% or about 1% to about 2% or about 1% or the starch. In some embodiments a method of making a thermally inhibiting starch or dry thermally inhibited starch comprises adjusting the pH of a starch by adding a buffer (e.g. a citrate buffer) in an amount about 0.1% and about 2% (w/w of starch) to a starch slurry. In some embodiments a method of making a thermally inhibiting starch or dry thermally inhibited starch comprises adjusting the pH of a starch by adding a buffer (e.g. a citrate buffer) in an amount about 0.5% and about 1.5% (w/w of starch) to a starch slurry. In some embodiment a method of making a thermally inhibiting starch or dry thermally inhibited starch comprises adjusting the pH of a starch by adding a buffer (e.g. a citrate buffer) in an amount of about 0.9% and about 1.2% (w/w of starch) to a starch slurry. In any embodiment a starch is soaked in a buffered solution for at least about 0.25 hours or about 0.25 to about 24 hours, or from about 0.3 hours to about 12 hours or from about 0.5 to about 8 hours. It is observed that the pH of the slurry increases over time during soaking such that after soaking a starch in buffer solution for from 0.5 to 24 hours, the starch slurry's pH is from about 6.5 to about 7.5.

It is observed that starch commonly has a natural pH of about 5.0 to about 6.5, but that commonly the processes used to separate starch from protein alter the starch's natural pH. In any embodiment described in this specification, prior to buffering, a starch may be obtained having a pH other than a natural pH of from about 5.0 to about 6.5. In any embodiment of the processes described in this specification, a starch is obtained having a pH less than about 5.0 and adjusting the pH of the starch by soaking the starch in a solution including a suitable base (including but not limited to sodium hydroxide) to obtain a starch having a pH of from about 5.0 to about 6.5. In any embodiment of the processes described in this specification, a starch is obtained having a pH greater than about 6.5 and adjusting the pH of the starch by soaking the starch in a solution including a suitable acid (including but not limited to hydrochloric acid) to a starch having a pH of from about 5.0 to about 6.5. In any embodiment described in this specification, a starch is soaked in acidic or basic solution until a starch slurry has a stable pH of from 5.0 to 6.5. In any embodiment described in this specification, a starch is soaked in acidic or basic solution for at least about 0.25 hours or for about 0.25 to about 24 hours, or from about 0.3 hours to about 12 hours or from about 0.5 to about 8 hours In any embodiment described in this specification, a method for making a thermally inhibited starch comprises adjusting the pH of a buffered starch slurry to an acidic pH prior to thermal inhibition. In any embodiment a buffered starch is adjusted to a native pH and is soaked in a buffered solution for at least about 0.25 hours or 0.25 to about 24 hours, or from about 0.3 hours to about 12 hours or from about 0.5 to about 8 hours. In any embodiment a starch is pH adjusted to an acidic pH for enough time for the pH of the starch slurry to stabilize at a pH of from greater than 4.0 to less than 6.0, or to more than about 4 to about 5.5 or to more than about 4 to about 5.4, or to more than about 4 to about 5.3, or to more than about 4 to about 5.2, or to more than about 4 to about 5.1 or to more than about 4 to about 5, or to more than about 4 to about 4.9, or to more than about 4 to about 4.8, or to more than about 4 to about 4.7 or to more than about 4 to about 4.6, or to more than about 4 to about 4.5, or about 4.1 to about 4.6, or about 4.2 to about 4.7, or about 4.3 to about 4.8, or about 4.5 to about 5.5, or about 4.4 to about 5.5, or about 4.3 to about 5.5, or about 4.2 to about 5.5 or about 4.1 to about 5.5, or about 4.6 to about 5.4, or about 4.8 to about 5.3. In any embodiment adjusting the pH of the slurry may including adjusting the pH to about 4.5 and 5.5. In any embodiment the adjusting the pH slurry may include adjusting the pH to about 4.8 to about 5.2. In any embodiment the adjusting the pH may include adjusting the pH to about 5 or at least about 5. In any embodiment a starch's pH is measured by, after dewatering and drying the starch from solution, resuspending the dry starch in water in a water to starch ratio of 4:1 and measuring the pH.

In any embodiment disclosed in this specification amount pH of the acidic starch slurry is controlled to limit or prevent the starch hydrolysis, as measured by soluble content. In any embodiment disclosed in this specification a thermally inhibited starch has soluble content of less than about 20%, or less about 15%, or less than about 10%, or less than about 5% or essentially 0%.

In any embodiment adjusting the pH of a starch comprises adding a food grade acid to a starch or a starch slurry. In any embodiment a food grade acid is any food grade or organic or mineral acid. In some embodiments a food grade acid used to adjust the pH of a starch or starch slurry include hydrochloric acid, sulfuric acid. In some embodiments a food grade acid is hydrochloric acid.

In any embodiment a method for making a thermally inhibited starch comprises, prior to thermal inhibition, dehydrating a starch to desired moisture content (w/w/) to obtain a starch having a desired low moisture content. In various embodiments the recovered, pH is adjusted starch is dehydrated to a moisture content of less than about 5% or less than about 4%, or less than about 3% or less than about 2% or less than about 1% or about 0% moisture content by weight of the starch, or to about 0% to about 6% or to about 0% to about 3%, or about 0% to about 2%, or to about 1% to about 5%, or to about 1% to about 4%, or to about 1% and about 3%, or to about 1% to 2% or to about 1%, or to about 0%. In some embodiments a pH adjusted starch is dried to moisture content of about 4% to about 6%, or to about 5% moisture content by weight of the starch, which is sometimes called to a substantially anhydrous state. In some embodiments a pH adjusted starch is dried to moisture content of about 0% to about 2%, or to about 1% moisture content by weight of the starch, which is sometimes called to an anhydrous state. In any embodiment a starch is dehydrated using conventional dry techniques such as flash drying, or oven drying, or freeze drying, or spray drying, or drying in a reactor suitable for thermally inhibiting a starch such as a fluidized bed rector. In any embodiment a method of making a dry thermally inhibited starch comprises drying a starch or a pH adjusted starch at a temperature sufficient to dry the starch but below the starch's gelatinization temperature. In any embodiment a method of making a thermally inhibited starch comprises drying a starch at a temperature below about 120° C., or below about 110° C. or below about 105° C., or below about 100° C. or about 80° C. to about 120° C., or about 85° C. to about 120° C., or between about 90° C. to about 110° C., or about 95° C. to about 110° C., or about 95° C. to about 105° C.

In any embodiment a method for making a thermally inhibited starch comprises dry heating a pH adjusted, dehydrated starch to one or more temperatures exceeding the starch's gelatinization temperature. In some embodiments the method comprises dry heating a dehydrated starch to a temperature above about 120° C., or above about 130° C., or above about 135° C., or above about 140° C., or above about 145° C., or above about 150° C., or above about 155° C., or above about 160° C., or above about 165° C., or up to a temperature of about 180° C., or about 120° C. to about 200° C., or about 120° C. to about 190° C., or about 120° C. to about 180° C., or about 130° C. to about 170° C., or about 135° C. to about 165° C., or about 140° C. to about 165° C., or about 145° C. to about 165° C., or about 150° C. to about 165° C., or about 155° C. to about 165° C. In any embodiment a starch is heated to a temperature about 155° C. to about 165° C. In any embodiment a starch is heated to a temperature of about 165° C. In any embodiment a starch is heated to a temperature of about 160° C. In any embodiment a starch is heated to a temperature of about 155° C.

In various embodiments a method for making a thermally inhibited starch comprises dry heating a pH adjusted, dehydrated starch for less than about 0.5 hours, or about 0.05 to about 4 hours, or about 0.1 to about 4 hours, or about 0.2 to about 4 hours, or about 0.2 to about 3 hours, or to about 0.2 to about 2 hours, or about 0.2 to about 1.5 hours, or about 0.25 to about 1.5 hours, or about 0.3 to about 1.5 hours, or about 0.35 to about 1.5 hours, or about 0.4 to about 1.5 hours, or about 0.45 to about 1.5 hours, or about 0.5 to about 1.5 hours, or about 0.5 to about 1 hour, or about 0.5 to about 0.9 hours, or about 0.5 to about 0.8 hours, or about 0.5 to about 0.7 hours, or about 0.5 to about 0.6 hours, about 0.1 hours, or about 0.2 hours, or about 0.3 hours, or about 0.4 hours or about 0.5 hours, or about 0.6 hours, or about 0.7 hours, or about 0.8 hours, or about 0.9 hours, or about 1 hour. In any embodiment a starch may thermally inhibited dry heating a pH adjusted, dehydrated starch for about 20 minutes (0.33 hours) and about 200 minutes (3.33 hours). In any embodiment a starch may thermally inhibited dry heating a pH adjusted, dehydrated starch for about 20 minutes (0.33 hours) and about 60 minutes (1 hour). In any embodiment a starch may thermally inhibited dry heating a pH adjusted, dehydrated starch for about 20 minutes (0.33 hours) and about 40 minutes (0.67 hours). In any embodiment a starch may thermally inhibited dry heating a pH adjusted, dehydrated starch for about 1 hour and 2 hours.

Reference to dry heating mean heating in air or other gas that does not chemically react with starch under the above described heating conditions. Dry heating is contrasted with heating in alcohol or other non-aqueous solution. Air used for dry heating may have various moisture content, but in any embodiment the moisture content of the air is less than needed to gelatinize the starch. In any embodiment starch is dehydrated in air at air pressure of about 1 atmosphere. In any embodiment starch is thermally inhibited in air at air pressure of about 1 atmosphere.

In some embodiments, the dehydrating and the thermally inhibiting may occur in the same apparatus. In some embodiments the dehydrating and the thermally inhibiting steps may occur in separate or different apparatuses.

In any embodiment, during thermally inhibiting, the starch (i.e. the pH adjusted starch and/or the pH adjusting and dehydrated starch) may be substantially free of alcohol. As used herein, "substantially free, means less than about 2 wt % alcohol, including less than about 1% wt or less than 0.5% wt, based on the weight of the starch. In any embodiment, during thermally inhibiting the starch may comprise no alcohol. In any embodiment, during dehydration the starch may comprise no alcohol. Alcohol means free of C4 alcohols and below, including but not limited to methanol, ethanol, propyl, or iso propyl alcohol.

In any embodiment a starch may be washed in water or aqueous solution prior to a starch slurry or after thermally inhibiting for one or more cycles.

The present technology provides a method including adding a buffer and an acid to a starch to obtain a pH adjusted starch having an acidic pH, dehydrating the pH adjusted starch to obtain a dehydrated, pH adjusted starch, and thermally inhibiting the dehydrated pH adjusted starch. During the pH adjustment step the buffer and acid may be added in either order.

The present technology provides a method including adjusting a starch in slurry to have a natural pH, adding buffer to the starch slurry, adjusting the pH of the slurry to an acidic pH, dehydrating the starch and thermally inhibiting the starch.

In some embodiments the technology provides a method including mixing starch, buffer, acid and aqueous solution to obtain a starch slurry and to obtain pH adjusted starch, recovering the pH adjusted starch from the starch slurry, dehydrating the pH adjusted starch to obtain a pH adjusted, dehydrated starch, and thermally inhibiting the pH adjusted, dehydrated starch. In any embodiment the buffer, acid, and aqueous solution may be mixed with the starch in any order. In any embodiment the aqueous solution may be water, or may be a buffered solution, or may be an acidic solution. In any embodiment a starch is adjusted at temperature below the starch's gelatinization temperature. In any embodiment a starch is thermally inhibited at temperature above the starch's gelatinization temperature.

The present technology further provides a starch made by the foregoing method. The present technology further provides starch made by the foregoing method and having a Hunter L value of than about 92, or greater than 92, or greater than 93, or greater than 94, or greater than 95, or about 92 to about 96 or about 92 to about 95, or about 93 to about 95, or about 94 to about 95, or about 95. The technology further provides starch made by the foregoing method having the forgoing hunter L values and having improved flavor compared to starches made from prior art processes.

In some embodiments, thermally inhibited starch having a low level of thermally inhibited is made at a temperature of about 150° C. to about 170° C. for about 25 to 150 minutes, or about 50 to 150 minutes or about 100 to 150 minutes.

In some embodiments thermally inhibited starch having a moderate level of inhibition has is made at a temperature of about 150° C. to 180° C. for about 30 to 100 minutes. In some embodiments thermally inhibited starch having a moderate level of inhibition has is made at a temperature of about 150° C. to 170° C. for about 60 to 100 minutes. In some embodiments thermally inhibited starch having a moderate level of inhibition has is made at a temperature of about 160° C. to 180° C. for about 30 to 50 minutes.

In some embodiments a highly thermally inhibited is made at a temperature of about 155° C. to 180° C. for about 30 to 200 minutes. In some embodiments a highly thermally inhibited is made at a temperature of about 160° C. to 170° C. for about 30 to 60 minutes. In some embodiments a highly thermally inhibited is made at a temperature of about 160° C. to 170° C. for about 100 to 200 minutes. In some embodiments a highly thermally inhibited is made at a temperature of about 160° C. to 170° C. for about 150 to 200 minutes.

The above described methods for making a thermally inhibited starch physically modify the starch to act like a chemically modified starch. Using the methods described herein yields thermally inhibited starches that behave like chemically crosslinked starches without being chemically crosslinked. Using the methods described herein yields thermally inhibited starches that are not acid hydrolyzed.

The present technology provides methods for making thermally inhibited starches in a batch reaction process, a continuous reaction process or the like, or a combination thereof.

In some batch reaction processes a fixed amount of starch may be held in a reactor for enough time to thermally inhibited starch to obtain a desired peak hot viscosity after which the starch may be released from the reactor. Some illustrative batch reaction processes may use a fluidized bed reactor. Fluidized bed reactors may include a shell reactor and may have one or more chambers that allow a fluid to flow through a solid; in any embodiment the fluid is air. The fluid may disperse the solid (and in any embodiment a starch) to form a relatively homogenous fluid-solid system. The shell reactor may be jacketed to provide heat. An illustrative fluid bed reactor is described in U.S. Pat. No. 5,378,434, which is incorporated herein in its entirety. Solids may be held in the reactor shell for an indefinite time and can be emptied from through an orifice in the reactor shell following completion of the reaction. Such reactions may utilize fixed amount that may be loaded into a reactor shell, may then be thermally inhibited, and then may be removed from the reactor shell before a next fixed amount of starch may be added to the reactor shell. In some embodiments a method for making thermally inhibited starch comprises heating a fixed amount of pH adjusted starch at one or more temperatures to dehydrate the starch and to thermally inhibited the starch, wherein such heating may be continuous or stepped. In some other embodiments a method for making a thermally inhibited starch includes heating a fixed amount of dehydrated, pH adjusted starch at one or more temperatures to thermally inhibited the starch.

Other reactors useful for thermally inhibiting starch include dextrinizers and the like, in which a starch is fluidized using mechanical means, such as rotational means, such as mixers having blades, paddles, rotors, screws, etc. that in operation cause the starch to move in a fluid like manner. Such reactors may be jacketed with heaters or steam heated to maintain the desired temperature for thermally inhibiting starch. In some embodiments thermally inhibiting using a mechanical fluidizing means is done under substantially vacuum conditions.

In some continuous reaction process a starch may added to and may pass through a reactor in time continuous manner such that starch is held in the reactor for a fixed time before it leaves, or is forced out of, or is otherwise removed from the reactor. In some embodiments the temperature used to obtain a thermally inhibit starch is adjusted to account for the residence time of the starch within the reactor. In some embodiments a starch is held in a reactor is modified to hold a starch for enough time to obtain a desired degree of inhibition. In some embodiments a process may include a fluidized bed that has been modified to allow for a substantially continuous process. In some embodiments a modified fluidized useful for making a thermally inhibited starch in a substantially continuous process is disclosed in U.S. Pat. No. 7,722,722, which is incorporated herein by reference. In some embodiments an apparatus for use includes a reactor shell having one or more sections connected in series by an aperture permitting solid material to pass from one cell to the next in a time sequential fashion. The reactor shell may further include one or more cells at least one of which may be jacketed to allow for heating the starch sample. In some embodiments starch continuously passes from one cell to next and eventually exits the reactor shell after being held in residence within the reactor for a time to thermally inhibit a starch to have a desired hot peak viscosity. In some embodiments a method for making thermally inhibited starch includes passing a pH adjusted starch through a continuous reactor at one or more temperatures to dehydrate the starch and to thermally inhibited the starch wherein progress from one temperature to another may be continuous or stepwise. In some other embodiments a method for making a thermally inhibited starch includes passing an amount of a dehydrated, pH adjusted starch through a continuous reactor at one or more temperatures to thermally inhibited the starch.

In some other embodiments of a continuous reaction process use a reactor such as those available from Vomm Impianti e Processi Srl and described in EP 0 710 670, which is incorporated herein by reference. In some embodiments such reactors may include a heated tubular reactor and may impel starch through a horizontal length of the reactor using a rotor blade. Other methods used in industry to dry or thermally modify solid materials may also be used.

In some embodiments starch is thermally inhibited to a low level of inhibition in a continuous process at a temperature of about 150° C. to about 170° C. at about 10 to about 40 minutes. In some embodiments starch is thermally inhibited to a low level of inhibition in a continuous process at a or about 150° C. to about 160° C. for about 25 to about 40 minutes. In some embodiments starch is thermally inhibited to a low level of inhibition in a continuous process at about 160° C. to 170° C. for about 10 to about 25 minutes, or from about 10 to about 15 minutes. In some embodiments, thermally inhibited starch having a moderate level of inhibition is made in a continuous process in a continuous process at about 150° C. to about 170° C. for about 60 to about 100 minutes, or 60 to about 70 minutes. In some embodiments, thermally inhibited starch having a moderate level of inhibition is made in a continuous process at a temperature of about 160° C. to about 180° C. for about 10 to about 25 minutes. In some embodiments a highly thermally inhibited is made in a continuous process at a temperature of about 180° C. and about 200° C. for between about 10 and about 25 minutes. In each of the foregoing embodiments, the starch has whiteness as measured by Hunter L value of at least about 91 or at least about 92 or from about 91 to about 95 or from about 92 to about 95.

The present technology provides thermally inhibited starches having higher processes tolerance than prior art starches.

The present technology provides uses of thermally inhibited starch in industrial products, cosmetic products, household products, pharmaceutical product, and edible products, and combinations thereof. In some embodiments a thermally inhibited starch is used as an ingredient in a food composition.

In some embodiments thermally inhibited starches are used in a food composition in amount of between 1% and 99% by weight product. In some embodiments a thermally inhibited starch is an ingredient in an edible composition, which may be provided for nutritive, non-nutritive, pharmaceutical, or nutraceutical purposes. In some embodiments an edible product is in tablet form, and a thermally inhibited starch is used as an excipient or binding agent, or disintegrating agent.

In some embodiments an edible product comprises a thermally inhibited starch and a second edible ingredient. In any embodiment a second edible ingredient is any edible second ingredient. In some embodiments a second edible a dairy ingredient including milk (and other liquid milk products), non-fat milk solids, or dairy proteins such as whey or casein. In some embodiments a second edible ingredient is an aqueous ingredient having a pH between 3 and 8, such ingredients include but are not limited milk, fruit and vegetable juices (from any source), vinegar, oils, and liquid extracts. In some embodiments a second edible ingredient is another starch or flour which may be in native, pregelatinized, or other modified form. In some embodiments a second ingredient is a gum or hydrocolloid. In some embodiments a second ingredient is useful as a stabilizers or emulsifier in food. In some embodiments a second ingredient is eggs or a saponin comprising extract or flour. In some embodiments a second ingredient is a fermenting agent or leavening agent such as yeast, or bacteria, or baking soda, or baking powder.

In some embodiments a thermally inhibited starch is an ingredient in a food composition which may be one or more the following non-limiting example: beverages, baked goods (cakes, cookies, brownies, pie crusts, bread, gluten-free product), confectionary products, retorted products, frozen products, dairy products, sauces, gravies, emulsions. In some embodiments a thermally inhibited starch is used in amount of about 1 to about 99% by weight of the food composition of about 1 to about 50% by weight, like for example about 1 to about 10%. In some embodiments, a baked good includes about 25% to about 50% by weight of a thermally inhibited starch, or about 25 to about 35%. In some embodiments in a baked good a thermally inhibited starch makes up about 25% to about 100% of all starch in the baked good, or about 50 to about 100%, or about 75 to about 100%. In some embodiments a food composition includes a liquid component for example a aqueous component or an oil component such composition including for example beverages, retorted products, sauces, gravies, yogurts and other dairy compositions, or emulsified compositions like mayonnaises, in such compositions a thermally inhibited starch is used in amounts of about 0.1 to 20% or about 1% to about 15% or about 1% to about 10% or about 1% to about 5.

In some embodiments a thermally inhibited starch is used to provide stable thickness to an emulsion or emulsion like food product including but not limited to food products processed and/or stored under harsh conditions, such as retorting, homogenization, fermenting, and freezing. In various embodiments a dry thermally inhibited starch is used to provide free-thaw stability, or to resist syneresis, or retrogradation of frozen edible products.

In some embodiments a thermally inhibited starch is used in an edible product to replace a chemically crosslinked, or otherwise inhibited starch. In some embodiments a thermally inhibited starch is to replace a non-inhibited starch. In some embodiments a thermally inhibited starch is used to reduce the amount of starch used in an edible composition.

Throughout this specification various ranges are listed which are intended to include all subranges within the disclosed ranges, and any pairing of the specifically named ranges.

Non-limiting embodiments of food compositions comprising a thermally inhibited starch follow:

EXAMPLE 1—ILLUSTRATIVE RECIPES

1a. Yogurt:

TABLE 1a

| Yogurt Recipe | |
| --- | --- |
| Ingredients | Wt. % |
| Non-fat milk | 95.01 |
| Nonfat dry milk low heat | 1.34 |
| Gelatin | 0.3 |
| Starch | 3.35 |
| Total | 100.0% |

All the dry ingredients are blended together and added to the milk. The mixture is blended using a Breddo Likwifier blender for 20-30 minutes at about 500 rpm, transferred to a holding tank, and then processed through MicroThermics® HVHW HTST processing equipment wherein, for upstream processing, the mixture is homogenized at 60° C. (140° F.) and 725 or 2175 psi, and then pasteurized at 98° C. (208° F.) for 6 minutes. For downstream processing, the mixture was preheated to 65° C. (150° F.), and then heated at 85-90° C. (185-195° F.) and 725 or 2175 psi for 6 minutes. The pasteurized yogurt mix was cooled to about 43° C. (110° F.). In samples that are fermented, the pH was reduced to 4.6 and the yogurt cooled to about 7-13° C. (45-55° F.). In other embodiments, homogenization is run at 65° C. In embodiments the homogenization process includes a pre heat, and in embodiments temperature and pressure are ramped from ambient to those desired from pasteurization.

1b. Mayonnaise

TABLE 1b

Mayonnaise Recipe

| | |
|---|---|
| Water | 55.35 |
| Vinegar (10%) | 4.5 |
| Mustard (medium spicy) | 2.5 |
| Egg yolk (pasteurized) | 3.5 |
| Rape seed oil | 25.0 |
| Sugar | 3.0 |
| Salt | 1.0 |
| Potassium sorbate | 0.15 |
| Starch | 5.0 |
| Total | 100.0% |

All the dry ingredients are blended together and added to the water. The mixture is blended under vacuum (600-700 mbar) using a Fryma Korum DISHO 7 inline homogenizer. The water phase is then heated to 95° C. to cook the starch, and then cooled to 30° C. or below. The egg yolk is added and blended with the water phase. The oil is then added to the pre-emulsion under high shear and vacuum (600-700 mbar) and homogenized until emulsified. The vinegar is then added and emulsified, and the temperature kept at about 20° C.

1c. Spoonable Dressing—

TABLE 1c part 1

Formulation Part 1 - Spoonable Dressing

| Ingredients (%) | Wt. % |
|---|---|
| Water | 61.0 |
| Vinegar (120 grain) | 12.50 |
| Sugar | 17.70 |
| Mustard powder | 1.10 |
| Paprika | 0.10 |
| Salt | 2.60 |
| Starch[1] | 5.00 |
| Total | 100.0% |

All the dry ingredients are blended together and added to the water and vinegar under agitation for complete dispersion. The mixture is heated to 195° C. to 200° C. for about 15 to 20 minutes to a good degree of starch cook. The resultant paste is then cooled to 80° C. The following ingredients are then added together—

TABLE 1c part 2

Formulation Part 2 - Spoonable Dressing

| Ingredient | Wt. % |
|---|---|
| Paste | 65.00 |
| Egg yolks | 4.50 |
| Vegetable oil | 30.50 |
| Total: | 100.00 |

The egg yolks are added to the paste and mixed well. The oil is then slowly added with agitation to form a pre-emulsion. This pre-emulsion is then passed through a colloid mill to form the final spoonable dressing emulsion.

1d. Cream Soup—

TABLE 1d

Cream Soup recipe

| Ingredients | Wt. % |
|---|---|
| Water | 68.9 |
| Cream | 15.0 |
| Mushrooms [1] | 10.0 |
| Sugar | 0.71 |
| Salt | 0.7 |
| Onion Powder | 0.25 |
| Lecithin (8.7% on fat) | 0.5 |
| White Pepper | 0.04 |
| Starch [2] | 3.9 |
| Total | 100.0% |

All dry ingredients are blended together. The water and cream are added to a beaker and the lecithin dispersed using an immersion blender. The dry ingredients are then added under agitation. The mixture was heated to 88° C. to 90° C. (190° F. to 195° F.) and held until a good starch cook is reached (about 12 to 18 minutes). Once cooled, each mixture was then used to fill 2-ounce jars. Powdered mixes can be made by substituting dry ingredients such as powdered milk solids for cream.

1e. Béchamel

TABLE 1e

Béchamel Recipe

| Ingredient | (wt) % |
|---|---|
| Whole Milk | 91.28 |
| Unsalted Butter | 5.00 |
| White Pepper | 0.02 |
| Salt | 0.30 |
| Starch | 3.00 |
| Soy Lecithin | 0.40 |
| Total | 100.00 |

1f. Pudding

TABLE 1f

Pudding Recipe

| Ingredients | % |
|---|---|
| Milk 2% | 84.55 |
| Sugar | 10.00 |
| Starch | 5.25 |
| Vanilla Flavor | 0.20 |
| Total | 100.00 |

Pudding are made by whisking the starch, sugar, and vanilla into milk and mixing until the ingredients are dispersed. The mixture is then cooked in a Thermomix® with set temperature to 90° C. During cooking the mixture is stirred at speed 1 for 40 minutes or until starch is fully cooked out. The cooked pudding is then filled into jars and allowed to cool.

In industrial scale processes, all the dry ingredients are blended together and added to the milk. The mixture is blended using a Breddo Likwifier blender for 20-30 minutes at about 500 rpm, transferred to a holding tank, and then processed through MicroThermics® HVHW HTST processing equipment wherein, for upstream processing, the mixture is homogenized at 60° C.-65° C. (140-150° F.) and 725-2175 psi, and then pasteurized at 98° C. (208° F.) for 30 seconds. The cooked pudding is then filled into jars and allowed to cool.

The following are further illustrative embodiments of the thermally inhibited starch as well as characterization of that starch.

1g. Gravy

TABLE 1g

| Gravy Recipe | |
| --- | --- |
| Ingredients | % |
| Milk 2% | 92.00 |
| Starch | 4.00 |
| Flavor (e.g. chicken or beef) | 1.00 |
| Salt | 2.00 |
| Color | 1.00 |
| Total | 100.00 |

1h. Pet Food

TABLE 1h(i)

| Pet Food Recipe 1 | | |
| --- | --- | --- |
| Ingredient | Chicken Dices Weight % | Gravy Weight % |
| Water | 1 | 90 |
| Pork Liver | 40 | 0 |
| Chicken Parts | 16 | 0 |
| Whole Chicken | 16 | 0 |
| Beef Lungs | 12 | 0 |
| Soybean Flour, Defatted | 6 | 0 |
| Sugar | 0 | 5 |
| Powdered Blood Plasma | 5 | 0 |
| Modified Waxy Cassava Starch[1] | 0 | 4 |
| Animal Fat | 1 | 0 |
| Salt (NaCl) | 1 | 0.5 |
| Dicalcium Phosphate | 1 | 0 |
| Caramel Color (Liquid) | 0 | 0.5 |
| Color, Vitamins, Minerals and Antioxidant | 1 | 0 |
| Total | 100 | 100 |

TABLE 1h(ii)

| Pet Food Recipe 2 | | |
| --- | --- | --- |
| Ingredient | Beef Slices Weight % | Gravy Weight % |
| Water | 1 | 90 |
| Beef | 40 | 0 |
| Beef Lungs | 20 | 0 |
| Pork Liver | 20 | 0 |
| Beef Spleen | 13 | 0 |
| Soybean Flour, Defatted | 7 | 0 |
| Sugar | 0 | 5 |
| Powdered Blood Plasma | 4.5 | 0 |
| Modified Waxy Cassava Starch[1] | 0 | 4 |

TABLE 1h(ii)-continued

| Pet Food Recipe 2 | | |
| --- | --- | --- |
| Ingredient | Beef Slices Weight % | Gravy Weight % |
| Animal Fat | 2 | 0 |
| Salt (NaCl) | 1 | 0.5 |
| Dicalcium Phosphate | 1 | 0 |
| Color | 0 | 0.5 |
| Vitamins, Minerals and Antioxidant | 0.5 | 0.5 |
| Total | 100 | 100 |

EXAMPLE 2—TESTING OF THERMALLY INHIBITED STARCH

Example 2a—Swelling Volume and Soluble Content of Thermally Inhibited Starch

Swelling volume and soluble content of a starch are measured as follows:
1. Prepare a 5% starch slurry in 1% NaCl solution in a beaker. 2. Cook in a boiling water bath (minimum temperature of 95° C.) for 20 minutes (stir for the first 3 minutes and then cover with a watch glass for the remaining time). 3. Dilute the solution to 1% in a graduated cylinder and allow it to settle for 24 hrs (72 hrs is required for the waxy rice starch, as its smaller particle size slows settling). 4. Record the volume of the settled sample in milliliters. 5. Extract an aliquot of the supernatant from the cylinder. 6. Using a hand-held refractometer or a polarimeter, measure the concentration of starch in the supernatant and calculate the % solubles.

Example 2b—Whiteness and Visocity Testing

Figure 1B:
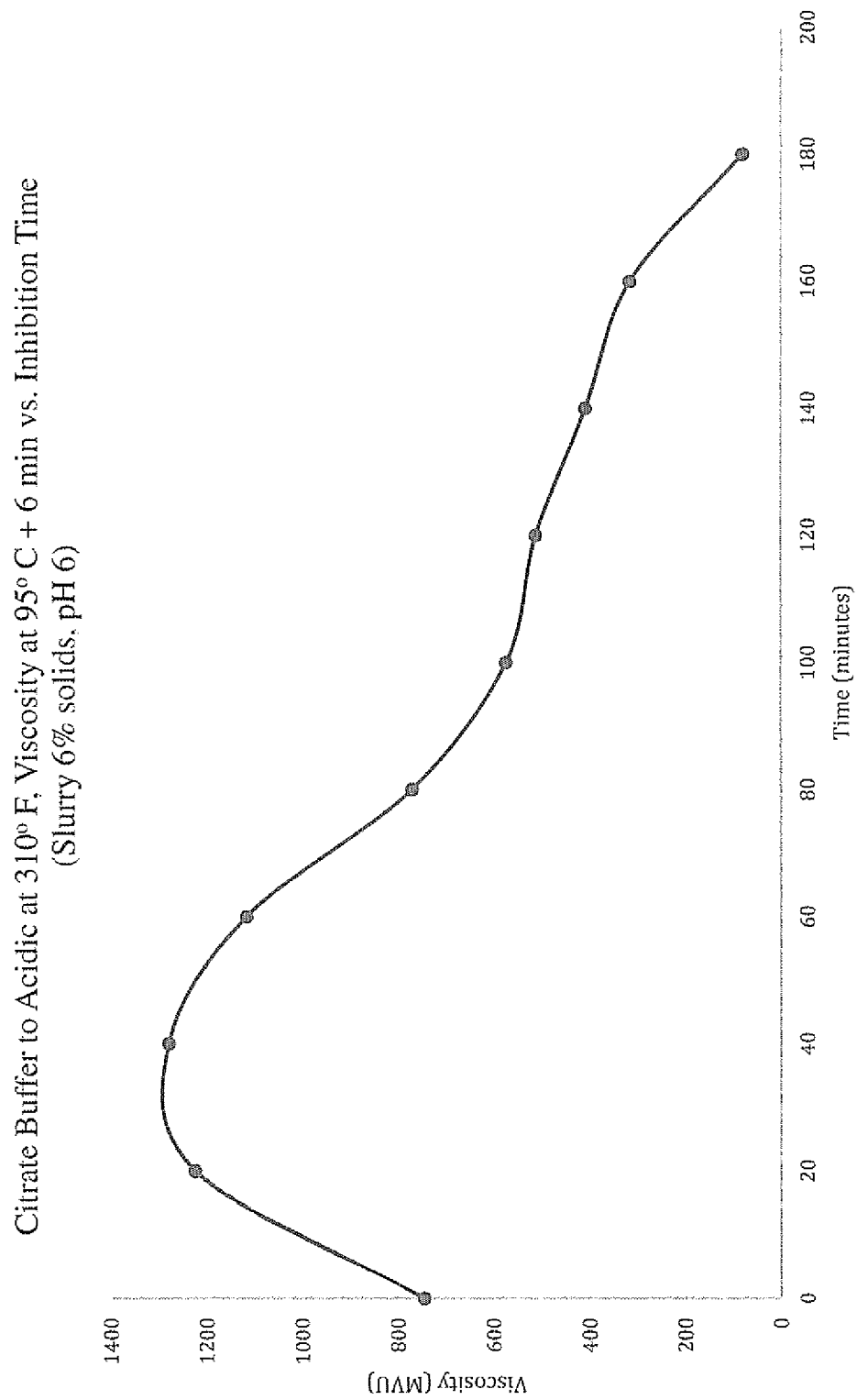
FIG. 1(b) plots the end points the of the viscosity profiles plotted in FIG. 1(b).
Figure 1C:
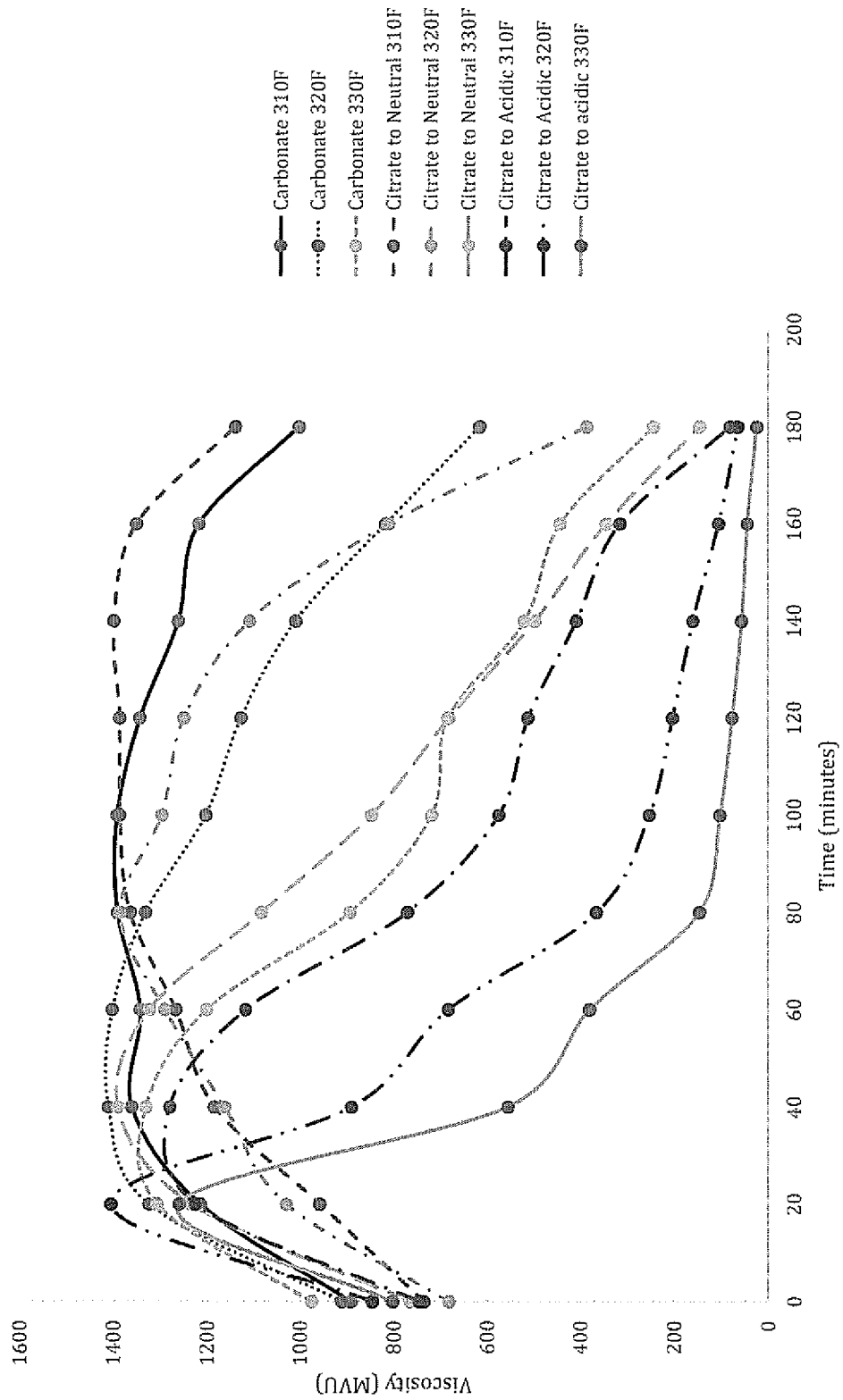
FIG. 1(c) plots the end points of the viscosity profiles of various thermally inhibited starches and compares the end point plots of thermally inhibited starches obtained using embodiments of the present technology as compared to some embodiments of thermally inhibited starch using prior art technology.

The effect of pH on thermally inhibition time was evaluated as follows. With reference to FIG. 1a applicants measured the MVU viscosity of thermally inhibited waxy corn starch made using a citrate buffer and pH adjusted to about 5. Starch was dehydrated to about 1% moisture (w/w) and was heated at 310° F. (about 154° C.) for the times shown. The MVU profile was obtained for starch slurry having 6% solids (w/w) and pH 6, using the following heating profile: heat from 45° C. to 95° C. degrees over six minutes and then was held at 95° C. for another 6 minutes. With reference two FIG. 1b the viscosity of each sample at 95° plus 6 minutes was plotted, illustrating the amount of inhibition varies with heating time. The foregoing test was repeated using starch made as described above but heated at 320° F. or 330° F. (about 160° C. to about 165° C.). The same plots as described above were obtained to illustrate how inhibition varies with heating time and temperature. To illustrate the effect buffer system and pH adjustment, the waxy corn starch was inhibited at the times and temperatures described above, but starch that was carbonate buffered and adjusted to pH of about 8 or was citrate buffered and adjusted to pH of about 7. The full set of 95° C.+6 minutes viscosity is plotted in FIG. 1c.

Figure 2:
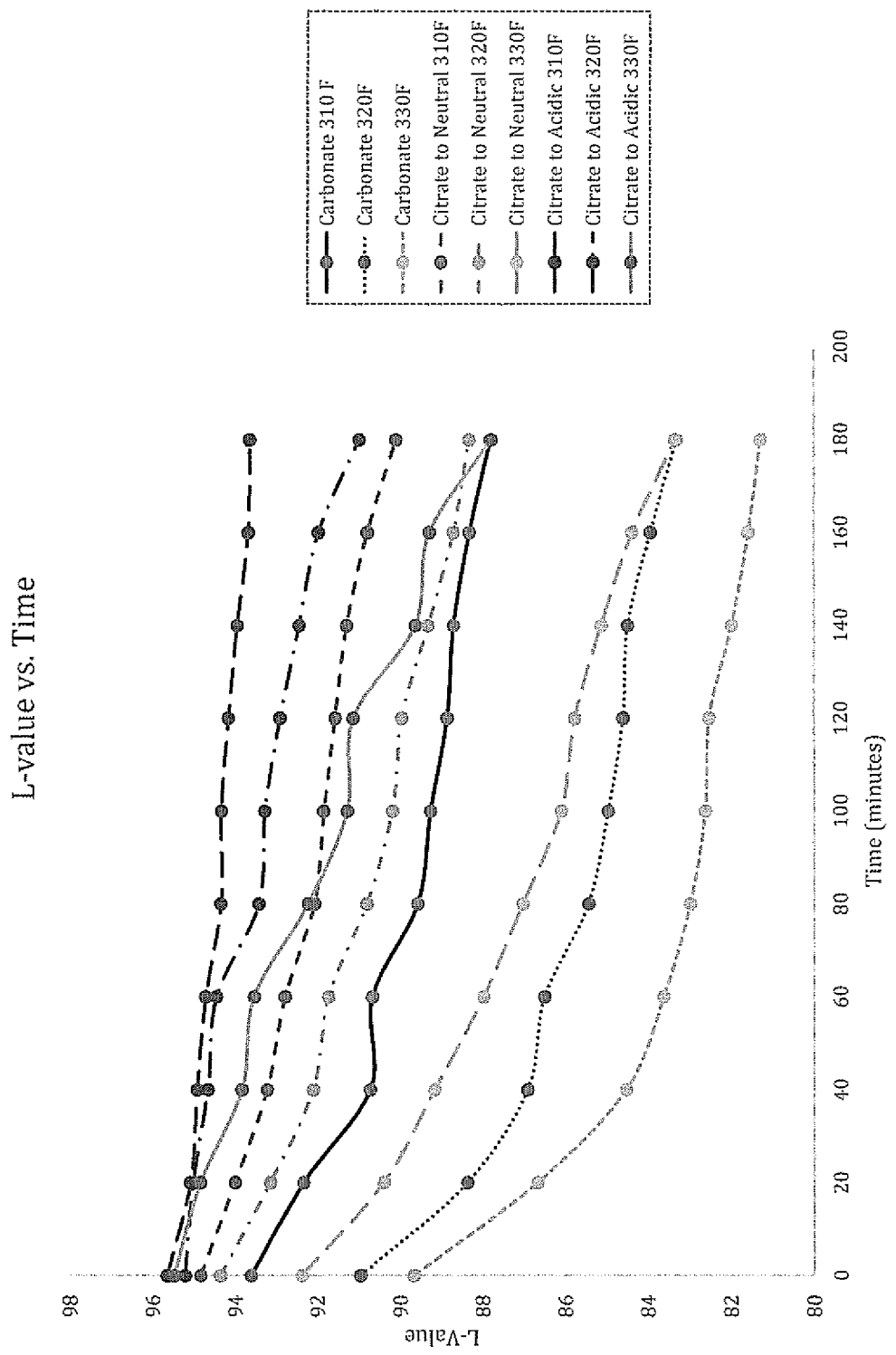
FIG. 2 plots the change in whiteness as thermal inhibition time increases and compares the whiteness for some of the various embodiments thermally inhibited starch made by the improved methods against various embodiments of thermally inhibited starch made by prior common methods.

FIG. 2 plots the Hunter L value of the above starches. To determine the color of powder, Hunter Color QUEST II spectrocolorimeter sphere model was used with Universal V.36 software and a NIR compression cell with quartz window. The equipment is standardized using a light trap, white and grey standardization tiles and a green calibration tile. First the light trap is inserted into the sample hold, then removed and followed by the white and grey tiles. Using the XYZ units, the white and green tiles are used to calibrate the equipment. Once the equipment is calibrated, the units are changed to hunter units. Using the quartz cell, approximately 4 grams of starch is added into the cell until the window is covered and the cell is packed. Place the cover on the cell and place the cell in the sample holder of the spectrocolorimeter. Using the software, select read sample to acquire data. The data collected will be in the form of L, a, b, and YI D1925(2/C).

Figure 3:
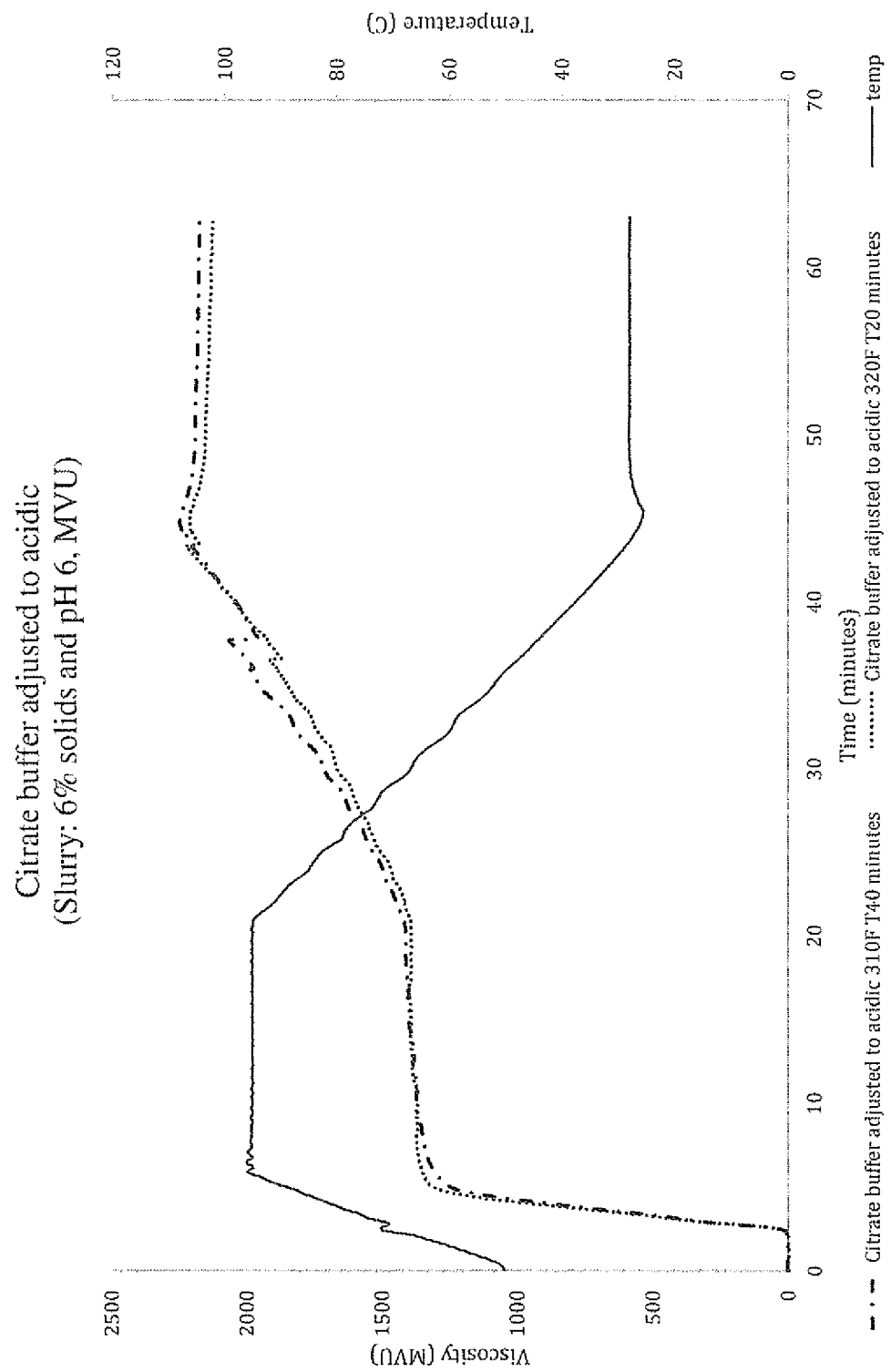
FIG. 3 plots the viscosity profile, obtained at pH 6 slurry, of thermally inhibited starches obtained by some of the various embodiments of the improved method.
Figure 4:
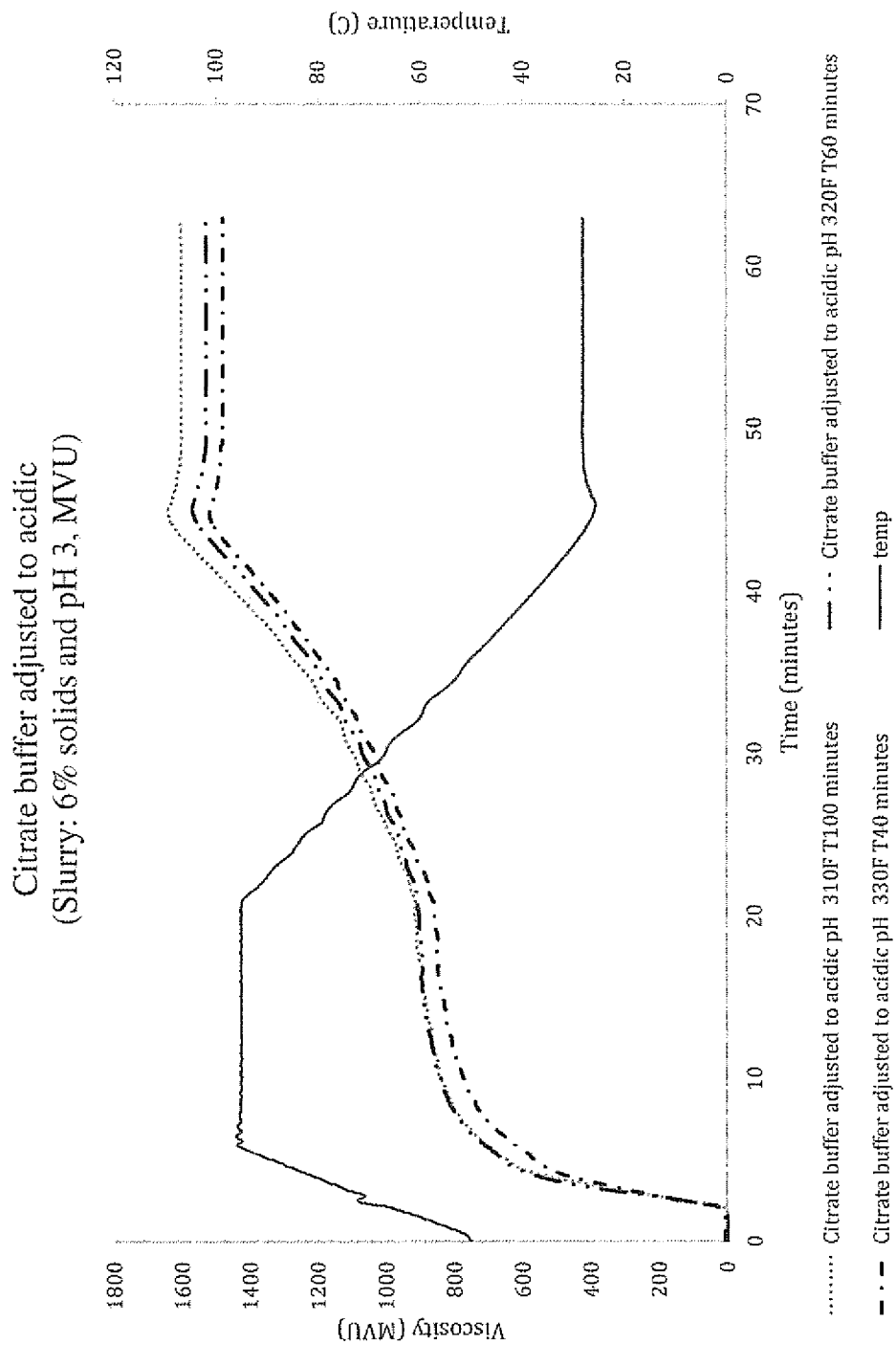
FIG. 4 plots the viscosity profiled, obtained at pH 3, of thermally inhibited starches obtained by some of the various embodiments of the improved method.
Figure 5:
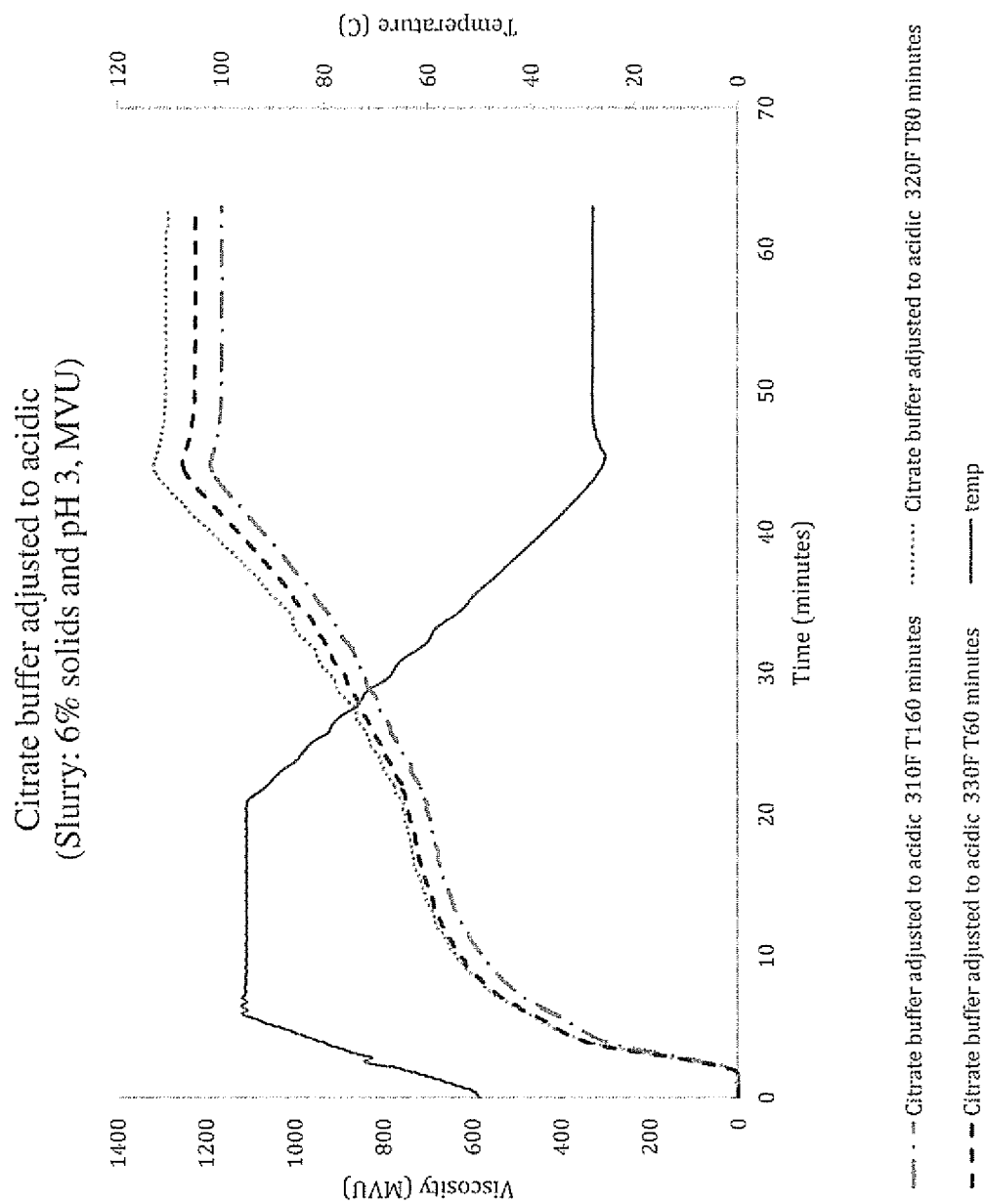
FIG. 5 plots the viscosity profile, obtained at pH 3, of thermally inhibited starches obtained by some of the various embodiments of the improved method (which differ from the embodiments of FIG. 4).

The viscosity change of a 6% solids starch slurry, was measured over the following time course: of starches made using a citrate buffer and adjusted to pH 5 heated as follows of starch slurry from room temperature to 50° C., further heating of slurry from 50° C. to 95° C. at a heating rate of 8° C./min, and holding slurry at 95° C. for 15 minutes. The starches were heated to obtain a desired viscosity profile consistent with commercially available lowly, moderately and highly inhibited starch. FIG. 3 illustrates the viscosity profile of a lowly inhibited starch in pH 6 slurry. FIG. 4 illustrates the viscosity profile of a moderately inhibited starch in pH 3 slurry. FIG. 5 illustrates the viscosity profile of a highly inhibited starch in pH 3 slurry.

The effect of time, temperature and pH on thermally inhibition was evaluated. In all samples a waxy corn starch was thermally. Samples were made using citrate buffer and adjustment to pH of about 5, using citrate buffer and adjustment to pH of about 7, and carbonate buffer and adjustment to pH about 8. Thermally inhibited using the above described buffer systems were dehydrated to about 1% moisture (w/w). Starch samples from each buffer system were then thermally inhibited one of 310° F., 320° F., or 330° F. (about 154° C., 160° C., or 165° C. Samples made at each thermally inhibition temperature were heated for one of 0 (uninhibited), 20, 40, 60, 80, 100, 120, 140, 160, and 180 minutes. All samples were tested whiteness recorded as a Hunter L value. Changes in Hunter L as inhibition time increases for a given buffer system and inhibition temperature are reported in FIG. 2.

EXAMPLE 3—SENSORY TESTING OF DRY THERMALLY INHIBITED STARCH

Sensory testing compared flavor of starch pastes (starch in water heating until gelatinization). Panelists evaluated pastes made from embodiments of the disclosed dry thermally inhibited starches made from waxy corn starch, commercially available thermally inhibited starches waxy corn starch from an alcohol-based process, commercially available dry thermally inhibited waxy corn starch, and unmodified waxy corn starch. All thermally inhibited samples were measured to have a peak hot viscosity of about 800 MVU.

Sensory testing was done using a trained panel of 10 people. Panelists were selected based on their ability to detect differences in aroma, flavor, taste and texture and their ability to express these differences. Individual panelists were trained for 4 months prior to panel integration, and all panelist participated in continuous maintenance training. Training comprises introducing panelists to company defined sensory terminology (TEXICON® and SWEETABULARY®) and 15-point universal scale ratings benchmarks with 0 meaning a flavor attribute was not detected, and 15 meaning that a flavor attribute was extreme.

Testing proceeded as follows: Panelists were presented three replicates of each sample in monadic and balanced order. During evaluation panelists were instructed to take a spoonful of the sample by mouth manipulate the sample to the point of swallowing, expectorate the sample swallow the saliva, and Evaluate the perceived intensity of the following flavors. Panelists evaluated samples as for the following attributes: i) Overall Flavor Intensity—meaning the impact of the total flavor of the sample; ii) Overall Source Flavor Intensity—meaning the perceived intensity of the flavor contributed by the raw material; iii) White Paper Flavor Intensity—meaning the perceived intensity of the flavor contributed by white paper; iv) Cardboard Flavor Intensity—meaning the perceived intensity of the flavor contributed by brown paper/cardboard; v) Overall Chemical Flavor Intensity (solvent, plastic/vinyl, chlorine, etc.)—meaning the perceived intensity of the flavor contributed by any chemical substance. Panelists were also asked to describe the chemical flavor tasted.

Ratings were collected through Compusense® Cloud data acquisition software and data were analyzed for statistical significance and statistical relevance use XLSTAT (2016) data analysis software.

Samples were prepared by Ingredion's Global Applications Team. Samples were stored and served at 40° F. in 4-ounce plastic cups with lids.

Results were reported in a Principal Component Analysis ("PCA") mapped in a Sensory Space. PCA investigates and plots a multi-dimensional dataset comprising quantitative variables. The Sensory Space allows, for study and visualization of the correlations between variables. It allows for obtaining non-correlated factors which are linear combinations of the initial variables to use these factors in modeling methods such as linear regression, logistic regression or discriminant analysis, and for visualizing observations in a multidimensional space to identify uniform or atypical groups of observations.

The plotted Sensory Space maps the relative intensity of a flavor observed for a sample. Flavor characteristics are placed along the perimeter of the plot. The closer a sample is to the characteristic the more intensely that flavor characteristic was observed for that sample. As seen prior art dry thermally inhibited waxy corn starch had the most intense cardboard and grain flavor.

The technology further pertains to the following non-limiting aspects.

In a first aspect, the technology discloses an improved thermally inhibited starch.

In a second aspect, this technology pertains to the thermally inhibited starch according to the first aspect having a Hunter L value of greater than about 92, or of about 92 to about 96.

In a third aspect, the technology pertains to the thermally inhibited starch of the first or second aspect having a hot peak viscosity (slurry at 6% solids, and pH 6) of about 50 to about 2000 MVU, or of about 50 to than about 500 MVU, or of about 500 to about 1200 MVU, or of about 1200 of about 2000 MVU.

In a fourth aspect, the technology pertains to the thermally inhibited starch of any one any one of the foregoing aspects having a hot peak viscosity (slurry at 6% solids, and pH 6) of about 50 to about 2000 cP, or of about 50 to about 500 cP, or of about 500 to about 1200 cP, or of about 1200 to about 2000 cP.

In a fifth aspect, the technology pertains to the thermally inhibited starch of any one any one of the foregoing aspects further having a hot peak viscosity (slurry at 6% solids and pH 6) of about 50 to about 500 MVU and a Hunter L value of about 91 to about 94.

In a sixth aspect, the technology pertains to the thermally inhibited starch of any one any one of the foregoing aspects further having a viscosity (slurry at 6% solids and pH 3) from 95° C. to 95° C.+15 of about 500 to about 1000 MVU.

In a seventh aspect, the technology pertains to the thermally inhibited starch of any one of the foregoing aspects further having a hot peak viscosity (slurry at 6% solids, and pH 6) of about 500 to about 1200 MVU and having a Hunter L value of about 93 to about 95.

In an eight aspect, the technology pertains to the thermally inhibited starch of any one of the foregoing aspects further having a viscosity (slurry at 6% solids and pH 3) that varies less than about 200 MVU at from 95° C. to 95° C.+15 minutes.

In a ninth aspect, the technology pertains to the thermally inhibited starch of any one of forgoing aspects further having a hot peak viscosity (slurry at 6% solids, and pH 6) of about 1200 to about 2000 MVU and having a Hunter L value of about 94 to about 96.

In a tenth aspect, the technology pertains to the thermally inhibited starch of any one of the foregoing aspects further having a viscosity (slurry at 6% solids and pH 6) that varies less than about 200 MVU at from 95° C. to 95° C.+15 minutes.

In an eleventh aspect, the technology pertains to the thermally inhibited starch of any one of the foregoing aspects having a sedimentation volume of about 10 to about 50 mL/g.

In twelfth aspect, the technology pertains to the thermally inhibited starch of any one of the claims the foregoing aspects being obtained by thermally inhibiting a milled plant material to obtain a thermally inhibited milled plant material, the thermally inhibited starch being present in the thermally inhibited milled plant material.

In a thirteenth, aspect the technology pertains to the thermally inhibited starch of any one of foregoing aspects being obtained by thermally inhibiting a milled and fractionated plant material to obtain a thermally inhibited and fractionated plant material, the thermally inhibited starch being present in the thermally inhibited milled and fractionated plant material.

In a fourteenth, aspect the technology pertains to the thermally inhibited starch of any one of the foregoing aspects wherein prior to thermal inhibition the milled and fractionated plant material has a starch content greater than about 95% (w/w).

In a fifteenth, aspect the technology pertains to the thermally inhibited starch of any one of the foregoing aspects being obtained from food grade starch.

In a sixteenth aspect, the technology pertains to the thermally inhibited starch of any one of the foregoing aspects having been obtained from the group consisting of corn, waxy corn, high amylose corn, tapioca, waxy tapioca, potato, waxy potato, rice, waxy rice, sago, pea, chick pea, lentil, and fava bean.

In a seventeenth aspect, the technology pertains to the thermally inhibited starch of any one of the foregoing aspects being substantially free of alcohol.

In an eighteenth aspect, the technology pertains to the thermally inhibited starch of any one of the foregoing aspects being thermally inhibited and dehydrated in a dry process.

In a nineteenth aspect, the technology pertains to the thermally inhibited starch of any one of the foregoing aspects made by a process comprising: i) adding buffer and acid to a starch to obtain a pH adjusted starch having an acidic pH; ii) dehydrating the pH adjusted in a dry process to obtain a dehydrated, pH adjusted starch; iii) and thermally inhibiting the dehydrated, pH adjusted starch in a dry process.

In a twentieth aspect, the technology pertains to the thermally inhibited starch made by the process of the nineteenth aspect wherein the buffer is and in amount of less than 5% by weight of the starch.

In a twenty-first aspect, the technology pertains to a thermally inhibited starch being made from the process of the nineteenth or twentieth aspect wherein the buffer is a citrate buffer.

In a twenty-second aspect, the technology pertains to a thermally inhibited starch being made from the process of any one of the nineteenth to twenty-first aspect wherein during step i) the starch's pH is adjusted to about 4 to less than about 6, or to about 4.5 to about 5.5.

In a twenty-third aspect, the technology pertains to a thermally inhibited starch made by the process of any one of the nineteenth to twenty-second aspects wherein the pH adjustment to the starch in step i) occurs in an aqueous starch slurry, wherein the starch slurry comprises the starch, the buffer and the acid; wherein the starch slurry has a pH of about 4 to less than about 6 or of about 4.5 to about 5.5.

In a twenty-fourth aspect, the technology pertains to a thermally inhibited starch made by the process of any one of nineteenth to twenty-third aspects wherein during step iii) the dehydrated, pH adjusted starch is substantially free of alcohol.

In a twenty-fifth aspect, the technology pertains to a thermally inhibited starch made by the process of any one of the nineteenth through twenty-fourth aspects wherein during step ii) the pH adjusted starch is substantially free of alcohol.

In a twenty-sixth aspect, the technology pertains to use of the thermally inhibited starch as recited in any of the preceding aspects in an industrial product, cosmetic products, household product, and edible product.

In a twenty-seventh aspect, the technology pertains to an edible composition comprising the thermally inhibited starch as recited in any one of the first to twenty-fifth aspects and a second edible ingredient.

In a twenty-eighth aspect, the technology pertains to the edible composition of the twenty-seventh aspect being selected from the group consisting of pharmaceutical composition, nutraceutical composition, non-nutritive composition, or food composition.

In a twenty-ninth aspect, the technology pertains to the edible composition of the twenty-seventh to twenty-eighth aspects being a food composition.

In a thirtieth aspect, the technology pertains to the edible composition of the twenty-seventh to twenty-ninth aspects being a food composition being selected from the group consisting of a sauce, a gravy, a dressing, a dairy product, a yogurt, a baked good, a retort product, and a soup.

In a thirty-first aspect, the technology pertains to the edible composition of the twenty-seventh to thirtieth aspects being selected from the groups consisting of a sauce, a gravy, a dressing, a dairy product, a yogurt, a retort product, and a soup, wherein the starch is used in amount of about 1% to about 10% by weight of the composition.

In a thirty-first aspect, the technology pertains to the edible composition of the twenty-seventh aspect being a baked good wherein the baked good has a total starch content of about 25% to about 50% starch of the baked good, and wherein the thermally inhibited starch makes up between about 25% and about 100% of the total starch (by weight of the total starch).

In a thirty-second aspect, the technology pertains to a method for making a thermally inhibited starch comprising: providing a starch and i) adding buffer and acid to the starch to obtain a pH adjusted starch having an acidic pH; and ii) thermally inhibiting the pH adjusted starch.

In a thirty-third aspect the technology pertains to the method of thirty-second aspect wherein the pH adjusted starch has pH of about 4 to less than about 6.

In a thirty-fourth aspect, the technology pertains to the method of the thirty-second or thirty-third aspect wherein the buffer is added in an amount less than about 5% of the starch.

In a thirty-fifth aspect, the technology pertains to the method of any one of the thirty-second to thirty-fourth aspects wherein the buffer is a citrate buffer.

In a thirty-sixth aspect, the technology pertains to the method of any one of the thirty-second to thirty fifth aspects the pH adjustment in step i) occurs in an aqueous slurry; the aqueous slurry including the acid, the buffer, and the starch the aqueous slurry thereby having acidic pH.

In a thirty-seventh aspect, the technology pertains to the method of the thirty-second to thirty-sixth aspects wherein the aqueous slurry has a pH of about 4 to less than about 6, or from about 4.5 to about 5.5.

In a thirty-eighth aspect, the technology pertains to the method of any one of the thirty-second to thirty-seventh aspects wherein the pH adjusted starch is thermally inhibited in step ii) by heating the starch to a temperature above the starch's gelatinization temperature for a time of about 0.05 to about 4 hours, or about 0.33 to about 3.33 hours, or between about 1 and about 2 hours.

In a thirty-ninth aspect, the technology pertains to the method of any one of the thirty-second to thirty-eighth aspects wherein the pH adjusted starch is thermally inhibited in step ii) by heating the pH adjusted starch at a temperature of about 120° C. to about 200° C.

In a fortieth aspect, the technology pertains to the method of any one of the thirty-second to thirty-ninth aspects wherein prior to step ii) the pH adjusted starch is dehydrated to a moisture content below about 5% by weight of the starch.

In a forty-first aspect, the technology pertains to the method of any one of the thirty-second to fortieth aspects wherein prior to step ii) the pH adjusted starch is dehydrated at a temperature below the starch's gelatinization temperature.

In a forty-second aspect, the technology pertains to the method of any one of the thirty-second to forty-first aspects wherein the pH adjusted starch is thermally inhibited in step ii) for about 0.05 to about 1.5 hours.

In a forty-third aspect, the technology pertains to the method of any one of the thirty-second to forty-second aspects wherein the pH adjusted starch is thermally inhibited in step ii) a temperature of about 150° C. to about 170° C. for about 20 to about 40 minutes.

In a forty-fourth aspect, the technology pertains to the method of any one of the thirty-second to forty-third aspects wherein the pH adjusted starch is thermally inhibited in step ii) at a temperature of about 160° C. to about 180° C. for about 30 to about 50 minutes In a forty-fifth aspect, the technology pertains to the method of any one of the thirty-second to forty-fourth aspects wherein the pH adjusted starch is thermally inhibited in step ii) at a temperature of about 160° C. to about 180° C. for about 45 and about 60 minutes.

In a forty-sixth aspect, the technology pertains to the method of any one of the thirty-second to forty-fifth aspects wherein the pH adjusted starch is dehydrated and thermally inhibited in a dry process.

In a forty-seventh aspect, the technology pertains to the method of any one of the thirty-second to forty-sixth aspects wherein the pH adjusted starch is dehydrated and thermally inhibited in air or in vacuum.

In a forty-eighth aspect, the technology pertains to the method of any one of the thirty-second to forty-seventh aspects wherein the starch is provided as a milled plant material or a milled and fractionated plant material.

In a forty-ninth aspect, the technology pertains to the method of any one of the thirty-second to forty-ninth aspects wherein the starch is provided as a milled and fractionated plant material having a starch content of greater than about 95% starch by weight.

In a fiftieth aspect, the technology pertains to the method of any one of the thirty-second to forty-ninth aspect wherein the starch is provided as a food grade starch.

In a fifty-first aspect, the technology pertains to the method of any one of any one of aspect thirty-second and fiftieth aspect wherein during the thermal inhibition of step ii) the pH adjusted starch is substantially alcohol free.

In a fifty-second aspect, the technology pertains to the method of any one of the thirty-second to fifty-first aspects wherein prior to the thermal inhibition of step ii) the pH adjusted starch is dehydrated and during dehydration the pH adjusted starch is substantially alcohol free.

In a fifty-third aspect, the technology pertains to the method of any one of the thirty second to fifty-second aspects making a substantially alcohol free thermally inhibited starch In a fifty-fourth aspect, the technology pertains to the method of any one of the thirty-second to fifty-third aspects further comprising washing the starch prior to step i) or after step ii) or both.

In a fifty-fifth aspect, the technology pertains to the method of any one of the thirty-second to fifty-fourth aspects wherein the method is carried out in one of a batch process, a continuous-like process, a continuous process and combinations thereof.

In a fifty-sixth aspect, the technology pertains to the method of any one the thirty-second to fifty-fifth aspect wherein the pH adjusted starch is thermally inhibited in a fluid bed reactor.

In a fifty-seventh aspect, the technology pertains to the method of any one of the thirty-second to fifty-sixth aspect wherein the pH adjusted starch is thermally inhibited in a continuous process, and optionally wherein the continuous process runs for about 10 to about 25 minutes.

In a fifty-eighth aspect, the technology pertains to the method of any one of the thirty-second to fifty-seventh aspects wherein the pH adjusted starch is thermally inhibited in a VOMM reactor.

In a fifty-ninth aspect, the technology pertains to the method of any one of the thirty-second to fifty-ninth aspects wherein the starch is dehydrated and thermally inhibited in a single apparatus.

In a sixtieth aspects, the technology pertains to the method of any one of the thirty-second to fifty-ninth aspects wherein the starch is dehydrated and thermally inhibited in different apparatuses.

In a sixty-first aspect, the technology pertains to the method of any of the thirty-second to sixtieth aspects wherein the thermally inhibited starch has a Hunter L value of greater than about 92, or greater than 92, or greater than 93, or greater than 94, or greater than 95, or about 92 to about 96 or about 92 to about 95, or about 93 to about 95, or about 94 to about 95, or about 95.

In a sixty-second aspect, the technology pertains to the method of any of the thirty-second to sixty-first aspects wherein the method improves the whiteness value of a thermally inhibited starch by a Hunter L value of at least about 2 or at least about 3 compared to a test thermally inhibited starch made at pH of about neutral or greater.

In a sixty-third aspect, the technology pertains to the method of any of the thirty-second to sixty-second aspects wherein the method improves the whiteness value of an unwashed thermally inhibited starch by a Hunter L value of at least about 3, or at least about 4, or at least about 5 compared to a test thermally inhibited starch at a pH of about neutral or greater.

In a sixty-fourth aspect, the technology pertains to the method of a starch as described in any of the thirty-second to sixty-third aspects wherein during step (i) the starch is soaked in an acidic slurry for from about 0.5 to about 24 hours.

In a sixty-fifth aspect, the technology pertains to a method of preparing a thermally inhibited starch comprising the steps of: a) obtaining a starch slurry; (b) optionally pH adjusting a pH of the starch slurry to obtain a starch having a pH substantially equivalent to the natural pH of starch; (c) adding a buffering agent to the starch slurry and soaking for more than a few minutes to obtain a buffered starch, (d) adjusting the pH of the slurry to from more than 4.0 to less than 6.0 for and soaking the starch in slurry and if necessary continuing to adjust the pH of the slurry until the slurry's pH stabilizes from more than about 4.0 to less than about 6.0 to obtain a pH adjusted starch; (e) dehydrating the pH adjusted starch to obtain; and (f) thermally inhibiting the dried starch to obtain a thermally inhibited starch.

In a sixty-sixth aspect, the technology pertains to the method of the sixty-fifth aspect wherein the in step (b) the starch is adjusted to a pH of from about 5.5 to about 6.5, by optionally soaking the starch in a pH adjusted slurry for from about 0.25 to about 24 hours, or from about 0.3 hours to about 12 hours or from about 0.5 to about 8 hours, and wherein the starch slurry is optionally pH adjusted by the addition of a base or an acid.

In a sixty-seventh aspect, the technology pertains to the method of the sixty-fifth or sixty-sixth aspects further comprising prior to step (a) obtaining a starch having a pH of less than about 5 and the pH adjustment of step (b) is accomplished by adding a base to the starch slurry, and wherein the base is optionally sodium hydroxide.

In a sixty-eighth aspect, the technology pertains to the method of any one of the sixty-fifth to sixty-seventh aspects wherein the starch is soaked in step (b) for from about 0.25 to about 24 hours, or from about 0.3 hours to about 12 hours or from about 0.5 to about 8 hours.

In a sixty-ninth aspect, the technology pertains to the method of any one of the sixty-fifth to sixty-eighth aspect step (d) adjusts the pH of the slurry to a lower pH, optionally using hydrochloric acid.

In a seventieth aspect, the technology pertains to the method of any one of the sixty-fifth to sixty-ninth aspect wherein the starch is soaked in step (d) for from about 0.25 to about 24 hours, or from about 0.3 hours to about 12 hours or from about 0.5 to about 8 hours.

In a seventy-first aspect, the technology pertains to the method of any one of the sixty-fifth to seventieth aspects wherein the buffer is either a citrate buffer or a carbonate buffer.

In a seventy-second aspect, the technology pertains to the method of any one of the sixty-fifth to the seventy-first aspects wherein in step (d) the starch is adjusted to a pH of more than about 4 to about 5.5 or to more than about 4 to about 5.4, or to more than about 4 to about 5.3, or to more than about 4 to about 5.2, or to more than about 4 to about 5.1 or to more than about 4 to about 5, or to more than about 4 to about 4.9, or to more than about 4 to about 4.8, or to more than about 4 to about 4.7 or to more than about 4 to about 4.6, or to more than about 4 to about 4.5, or about 4.1 to about 4.6, or about 4.2 to about 4.7, or about 4.3 to about 4.8, or about 4.5 to about 5.5, or about 4.4 to about 5.5, or about 4.3 to about 5.5, or about 4.2 to about 5.5 or about 4.1 to about 5.5, or about 4.6 to about 5.4, or about 4.8 to about 5.3, or from about 4.8 to about 5.2.

In a seventy-third aspect, the technology pertains to the method of any one of the sixty-fifth to seventy-second aspects wherein in step (e) the starch is dehydrated to a moisture content of about 5% or less than about 4%, or less than about 3% or less than about 2% or less than about 1% or about 0% moisture content by weight of the starch, or to about 0% to about 6% or to about 0% to about 3%, or about 0% to about 2%, or to about 1% to about 5%, or to about 1% to about 4%, or to about 1% and about 3%, or to about 1% to 2% or to about 1%, or to about 0%.

In a seventy-fourth aspect, the technology pertains to the method of any one of the sixty-fifth to seventy-third aspects wherein in step (e) starch is dehydrated at a temperature below the starch's gelatinization temperature.

In a seventy-fifth aspect, the technology pertains to the method of any one of the sixty-fifth to seventy-fourth aspects wherein the starch is heated in step (f) to a temperature above the starch's gelatinization for about 0.05 to about 4 hours, or about 0.1 to about 4 hours, or about 0.2 to about 4 hours, or about 0.2 to about 3 hours, or to about 0.2 to about 2 hours, or about 0.2 to about 1.5 hours, or about 0.25 to about 1.5 hours, or about 0.3 to about 1.5 hours, or about 0.35 to about 1.5 hours, or about 0.4 to about 1.5 hours, or about 0.45 to about 1.5 hours, or about 0.5 to about 1.5 hours, or about 0.5 to about 1 hour, or about 0.5 to about 0.9 hours, or about 0.5 to about 0.8 hours, or about 0.5 to about 0.7 hours, or about 0.5 to about 0.6 hours, about 0.1 hours, or about 0.2 hours, or about 0.3 hours, or about 0.4 hours or about 0.5 hours, or about 0.6 hours, or about 0.7 hours, or about 0.8 hours, or about 0.9 hours, or about 1 hour.

In a seventy-sixth aspect, the technology pertains to the method of any one of the sixty-fifth to seventh-fifth aspects wherein the starch is thermally inhibited in step (f) at a temperature of from about 120° C. to about 200° C., or about 120° C. to about 190° C., or about 120° C. to about 180° C., or about 130° C. to about 170° C., or about 135° C. to about 165° C., or about 140° C. to about 165° C., or about 145° C. to about 165° C., or about 150° C. to about 165° C., or about 155° C. to about 165° C. In any embodiment a starch is heated to a temperature about 155° C. to about 165° C.

In a seventy-seventh aspect, the technology pertains to the method of any one of the sixty-fifth to seventy-sixth aspects wherein the starch is thermally inhibited in step (f) at a temperature of 150° C. to 170° C. for 20 to 40 minutes, or at a temperature of 160° C. to 180° C. for 30 to 50 minutes, or at a temperature of 160° C. to 180° C. for 45 and 60 minutes.

In a seventy-eighth aspect, the technology pertains to the method of any one of the sixty-fifth to seventh-seventh aspects wherein the pH adjusted starch is dehydrated and thermally inhibited in a dry process, and optionally in air or in vacuum.

In a seventy-ninth aspect, the technology pertains to the method of any one of any one of aspect sixty-fifth to seventy-eighth aspects wherein the thermally inhibited starch substantially alcohol free, and optionally is substantially alcohol free at each step from steps (a) through (f).

In an eightieth aspect, the technology pertains to the method of any one of the sixty-fifth to seventy-ninth aspects further comprising washing the starch prior to step (a) or after step (f) or both.

In an eighty-first aspect, the technology pertains to the method of any one of the sixty-fifth to eightieth aspects wherein the method is carried out in one of a batch process, a continuous-like process, a continuous process and combinations thereof.

In an eighty-second aspect, the technology pertains to the method of any one the sixty-fifth to eighty-second aspects wherein the pH adjusted starch is thermally inhibited in a fluid bed reactor or mechanical mixer.

In an eighty-third aspect, the technology pertains to the method of any one of the sixty-fifth to eighty-second aspects wherein the pH adjusted starch is thermally inhibited in a continuous process, or optionally in a VOMM reactor, or optionally for about 10 minutes to about 25 minutes.

In an eighty-fourth aspect, the technology pertains to the method of any one of the sixty-fifth to eighty-third aspects wherein the starch is dehydrated and thermally inhibited in one or more apparatuses.

In an eighty-fifth aspect, the technology pertains to the method of any of the sixty-fifth to eighty-fourth aspects the thermally inhibited has a Hunter L value of greater than about 92, or greater than 92, or greater than 93, or greater than 94, or greater than 95, or about 92 to about 96 or about 92 to about 95, or about 93 to about 95, or about 94 to about 95, or about 95.

In an eighty-sixth aspect the technology pertains to the method of any of the sixty-fifth to eighty-fifth aspects wherein the method improves the whiteness value of a thermally inhibited starch by a Hunter L value of at least about 2 or at least about 3 compared to a test thermally inhibited starch made at pH of about neutral or greater.

In an eighty-seventh aspect, the technology pertains to the method of any of the sixty-fifth to eighty-sixth aspects wherein the method improves the whiteness value of an unwashed thermally inhibited starch by a Hunter L value of at least about 3, or at least about 4, or at least about 5 compared to a test thermally inhibited starch at a pH of about neutral or greater.

In an eighty-eighty aspect, the technology pertains to the method of any of the sixty-fifth to eighty-seventh aspects, wherein the protein level of the starch is less than 1% (w/w) or is less than 0.5% or, is less than 0.3%.

In an eighty-ninth aspect, the technology pertains to the method of any of the sixty-fifth to eighty-eighth aspects, wherein the thermally inhibited has a soluble starch content of less than about 20%, or less about 15%, or less than about 10%, or less than about 5% or essentially 0%.

In a ninetieth aspect, the technology pertains to the method of any of the sixty-fifth to eighty-ninth aspects wherein the starch obtained from the method has a peak hot viscosity up to about 2000 MVU, or about 50 and about 2000 MVU, or less than about 500 MVU, or about 50 to about 500, or about 100 to about 500 MVU, or about 100 to about 400 MVU, or about 100 to about 300 MVU, or about 100 to about 200 MVU, or about 500 to about 1200 MVU, or about 600 to about 1200 MVU, or about 700 to about 1200 MVU, or about 800 to about 1200 MVU, or about 900 to about 1200 MVU, or about 1000 to about 1200 MVU, or about 1200 to about 2000 MVU, or about 1300 to about 2000 MVU, or about 1400 to about 2000 MVU, or about 1500 to about 2000 MVU, or about 1600 to about 2000 MVU, or about 1700 to about 2000 MVU, or about 1800 to about 2000 MVU.

In a ninety-first aspect, the technology pertains to a starch made according to any of the foregoing processes.

In a ninety-second aspect, the technology pertains to use of the starch of the ninety-first aspect in a groups consisting of industrial products, cosmetic products, household product, and edible product.

In a ninety-third aspect, the technology pertains to composition comprising the starch of the ninety-first aspect and a second ingredient.

The recitation of various embodiments and aspects of the technology illustrative and not limiting. Other embodiments and aspects of the technology that are not specifically recited in this specification would be within the skill of one of ordinary skill in the art, and as such are encompassed by the scope of the claims either literally or by equivalence at least by reason of the following.

Use of "about" to modify a number is meant to include the number recited plus or minus 10%. Where legally permissible recitation of a value in a claim means about the value. Use of about in a claim or in the specification is not intended to limit the full scope of covered equivalents.

Use of "about neutral pH" is meant to include a pH range of about 6.5 to about 7.5.

Recitation of the indefinite article "a" or the definite article "the" is meant to mean one or more unless the context clearly dictates otherwise.

While certain embodiments have been illustrated and described, a person with ordinary skill in the art, after reading the foregoing specification, can effect changes, substitutions of equivalents and other types of alterations to the methods, and the starch of the present technology including uses of such starch in food composition, nutraceutical compositions, or pharmaceutical compositions industrial composition, household compositions, and cosmetic composition. Each aspect and embodiment described above can also have included or incorporated therewith such variations or aspects as disclosed regarding any or all the other aspects and embodiments.

The present technology is also not to be limited in terms of the aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to methods, conjugates, reagents, compounds, compositions, labeled compounds or biological systems, which can, of course, vary. All methods described herein can be performed in any suitable order unless otherwise indicated herein or otherwise clearly contradicted by context. It is also to be understood that the terminology used herein is for the purpose of describing aspects only and is not intended to be limiting. Thus, it is intended that the specification be considered as exemplary only with the breadth, scope and spirit of the present technology indicated only by the appended claims, definitions therein and any equivalents thereof. No language in the specification should be construed as indicating any non-claimed element as essential.

The embodiments illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the technology. This includes the generic description of the technology with a proviso or negative limitation removing any subject matter from the genus, regardless of whether the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member, and each separate value is incorporated into the specification as if it were individually recited herein.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:

1. A method of preparing a dry thermally inhibited starch comprising the steps of:
   a) obtaining a starch slurry;
   b) adjusting a pH of the starch slurry to obtain a starch having a pH substantially equivalent to the natural pH of starch;
   c) adding a buffering agent to the starch slurry and soaking for more than a few minutes to obtain a buffered starch,
   d) adjusting the pH of the slurry to from more than about 4.0 to less than about 5.5, soaking the buffered starch in the slurry and if necessary, continuing to adjust the pH of the slurry until the slurry's pH stabilizes at from more than about 4.0 to less than about 5.5 to obtain a pH adjusted starch;
   e) dehydrating the pH adjusted starch to moisture content of less than about 1% to obtain a dried starch; and
   f) thermally inhibiting the dried starch to obtain a thermally inhibited starch wherein the dried starch is heated to a temperature above the starch's gelatinization for from about 0.2 to about 4 hours.

2. The method of claim 1 wherein in step b) the starch is adjusted to a pH of from about 5.5 to about 6.5.

3. The method of 1 further comprising, prior to step a), obtaining a starch having a pH of less than about 5.

4. The method of claim 1 wherein the buffer is a citrate buffer.

5. The method of claim 1 wherein the starch is thermally inhibited in step f) at a temperature of from about 135° C. to about 165° C.

6. The method of claim 1 wherein the pH adjusted starch is thermally inhibited in a fluid bed reactor.

7. The method of claim 1 wherein the pH adjusted starch is thermally inhibited in a continuous process.

8. The method of claim 1 wherein the thermally inhibited has a soluble starch content of less than about 10%.

9. The method of claim 1 wherein the starch obtained from the method has a peak hot viscosity, in a slurry of 6% solids and pH 6, selected from the group consisting of a) from about 50 to about 500 MVU, b) from about 500 to about 1200 MVU and c) 1200 to about 2000 MVU.

10. The method of claim 1 wherein thermally inhibiting the starch in step (f) is at a temperature from about 150° C. to about 170° C. for about 25 to 150 minutes; and wherein the thermally inhibited starch obtained from the method has a hot peak viscosity in a slurry of 6% thermally inhibited starch solids and pH 6 of from about 1200 to about 2000 MVU.

11. The method of claim 1 wherein thermally inhibiting the starch in step (f) is at a temperature from about 150° C. to 180° C. for about 30 to 100 minutes; and wherein the thermally inhibited starch obtained from method has a peak hot viscosity from in a slurry of 6% thermally inhibited solids and pH 6 of from about 500 to about 1200 MVU.

12. The method of claim 1 wherein thermally inhibiting the starch in step (f) is at a temperature from about 155° C. to 180° C. for about 30 to 200 minutes; and wherein the thermally inhibited starch obtained from the method has a peak hot viscosity in a slurry of 6% solids and pH 6 of from about 50 to about 500 MVU.

13. The method of claim 1 wherein the thermally inhibited starch obtained from the method has a Hunter whiteness value of greater than about 92.

14. The method of claim 1 wherein thermally inhibiting the starch in step (f) is at a temperature from about 155° C. to 180° C. for about 30 to 200 minutes; wherein the thermally inhibited starch obtained from the method has a Hunter L value of about 91 to about 94; and wherein the thermally inhibited starch obtained from the method has a peak hot viscosity in a slurry of 6% solids and pH 6 of from about 50 to about 500 MVU.

15. The method of claim 1 wherein thermally inhibiting the starch in step (f) is at a temperature from about 150° C. to about 170° C. for about 25 to 150 minutes; wherein the thermally inhibited starch obtained from the method has a Hunter L value of about 93 to about 95, and wherein the thermally inhibited starch obtained from the method has a hot peak viscosity in a slurry of 6% thermally inhibited starch solids and pH 6 of from about 1200 to about 2000 MVU.

16. The method of claim 1 wherein thermally inhibiting the starch in step (f) is at a temperature from about 150° C. to 180° C. for about 30 to 100 minutes; wherein the thermally inhibited starch obtained from the method has a Hunter L value of about 94 to about 96; and wherein the thermally inhibited starch obtained from method has a peak hot viscosity from in a slurry of 6% thermally inhibited solids and pH 6 of from about 500 to about 1200 MVU.

\* \* \* \* \*